(12) United States Patent
Coombs

(10) Patent No.: US 10,472,068 B2
(45) Date of Patent: Nov. 12, 2019

(54) INTERMEDIATE STOWAGE RETAINER FOR AIRCRAFT MONUMENT STORAGE BAY

(71) Applicant: B/E Aerospace, Inc., Winston Salem, NC (US)

(72) Inventor: Allan Coombs, Verwood Dorset (GB)

(73) Assignee: B/E Aerospace, Inc., Winston Salem, NC (US)

( * ) Notice: Subject to any disclaimer, the term of this patent is extended or adjusted under 35 U.S.C. 154(b) by 78 days.

(21) Appl. No.: 15/647,224

(22) Filed: Jul. 11, 2017

(65) Prior Publication Data

US 2018/0016011 A1  Jan. 18, 2018

Related U.S. Application Data

(60) Provisional application No. 62/361,460, filed on Jul. 12, 2016.

(51) Int. Cl.
*B64D 11/04* (2006.01)
*B64D 13/08* (2006.01)
(Continued)

(52) U.S. Cl.
CPC .............. *B64D 11/04* (2013.01); *B21D 47/00* (2013.01); *B21D 53/92* (2013.01); *B60H 1/00014* (2013.01); *B64D 9/003* (2013.01); *B64D 11/00* (2013.01); *B64D 11/0007* (2013.01); *B64D 13/06* (2013.01); *B64D 13/08* (2013.01); *B64F 5/00* (2013.01); *E05B 65/06* (2013.01); *E05F 5/06* (2013.01); *F24C 15/2035* (2013.01);
(Continued)

(58) Field of Classification Search
CPC ..... B64C 1/1407; B64D 11/04; B64D 11/007; B64D 9/003; E05C 5/00; E05C 5/02; E05C 5/04; E05C 2005/005; E05B 1/0092; Y10T 292/106; Y10T 292/1043; Y10T 292/1075; Y10T 292/1083; Y10S 292/15
USPC ........................................................... 81/484
See application file for complete search history.

(56) References Cited

U.S. PATENT DOCUMENTS 119,491 A * 10/1871 Alderfer ................. E05C 3/124
292/227
501,639 A * 7/1893 Badoni ................... E05B 55/00
70/153
(Continued)

*Primary Examiner* — Colleen M Chavchavadze
(74) *Attorney, Agent, or Firm* — Suiter Swantz pc llo

(57) ABSTRACT

In an illustrative embodiment, an intermediate retaining assembly secures a rearmost equipment item of at least two horizontally-stacked equipment items within an aircraft galley compartment. The intermediate retaining assembly may include a manual control coupled to a first end of a rod where rotation of the manual control causes rotation of the rod. A retaining lever may engage a second end of the rod upon moving the rod to an axially extended position such that rotation of the rod causes the retaining lever to rotate between a position for securing the rearmost equipment item and a position for removing the rearmost equipment item from or inserting into the compartment. A mounting plate may be secured to an interior surface of the compartment and may have a recess for receiving the retaining lever, preventing the retaining lever from interfering with the equipment item during insertion into or release from the compartment.

20 Claims, 16 Drawing Sheets

(51) Int. Cl.
  *B64D 13/06*   (2006.01)
  *E05B 65/06*   (2006.01)
  *E05F 5/06*    (2006.01)
  *B64D 9/00*    (2006.01)
  *B64D 11/00*   (2006.01)
  *B21D 47/00*   (2006.01)
  *B21D 53/92*   (2006.01)
  *B64F 5/00*    (2017.01)
  *F24C 15/20*   (2006.01)
  *F24C 15/30*   (2006.01)
  *F24C 15/34*   (2006.01)
  *F25D 23/10*   (2006.01)
  *B60H 1/00*    (2006.01)
  *B64D 11/02*   (2006.01)
  *F16B 5/02*    (2006.01)

(52) U.S. Cl.
  CPC .............. *F24C 15/30* (2013.01); *F24C 15/34* (2013.01); *F25D 23/10* (2013.01); *B64D 11/003* (2013.01); *B64D 11/02* (2013.01); *B64D 2011/0046* (2013.01); *B64D 2011/0076* (2013.01); *B64D 2013/0629* (2013.01); *F16B 5/02* (2013.01); *Y10S 292/15* (2013.01); *Y10T 292/106* (2015.04); *Y10T 292/1043* (2015.04); *Y10T 292/1075* (2015.04); *Y10T 292/1083* (2015.04)

(56) References Cited

U.S. PATENT DOCUMENTS

| | | | | |
|---|---|---|---|---|
| 903,409 | A * | 11/1908 | Schneider | E05C 17/446 292/153 |
| 942,686 | A * | 12/1909 | Webb | E05C 3/124 292/227 |
| 1,062,110 | A * | 5/1913 | Moore | E05C 19/14 292/66 |
| 1,214,754 | A | 2/1917 | Carscadden | |
| 1,215,376 | A * | 2/1917 | Howard | E05C 3/124 292/227 |
| 1,416,308 | A * | 5/1922 | Silverman | E05C 9/06 114/117 |
| 2,123,188 | A * | 7/1938 | Hurlbut | E05C 17/443 292/139 |
| 2,246,787 | A * | 6/1941 | Dall | E05B 83/16 292/108 |
| 2,469,601 | A * | 5/1949 | Lee | E05B 13/002 292/202 |
| 2,589,872 | A * | 3/1952 | Schetky | B60P 1/26 292/97 |
| 4,056,276 | A * | 11/1977 | Jarvis | E05B 47/06 292/117 |
| 4,759,577 | A * | 7/1988 | Thomas, III | E05C 17/443 292/338 |
| 4,993,247 | A | 2/1991 | Minemura | |
| 5,098,138 | A * | 3/1992 | Vandewege | E05C 17/443 292/338 |
| 5,186,516 | A | 2/1993 | Alexander et al. | |
| 5,197,314 | A | 3/1993 | Stillwagon et al. | |
| 5,280,973 | A * | 1/1994 | Culling | E05B 17/0025 292/342 |
| 5,337,977 | A * | 8/1994 | Fleming | B64C 1/1407 244/129.5 |
| 5,490,455 | A * | 2/1996 | Conti | B30B 9/3003 100/100 |
| 5,548,982 | A | 8/1996 | Rawling | |
| 6,116,660 | A | 9/2000 | Langkamp, Jr. et al. | |
| 6,722,711 | B2 * | 4/2004 | Kitzis | B65F 1/1615 292/145 |
| 7,255,376 | B2 * | 8/2007 | Pratt | B64C 1/1469 244/129.4 |
| 7,510,223 | B2 * | 3/2009 | Malkowski, Jr. | E05B 15/022 292/304 |
| 9,238,926 | B2 * | 1/2016 | Guerrero | E05B 17/2076 |
| 9,267,314 | B2 * | 2/2016 | Kibler | B60P 1/26 |
| 9,523,219 | B2 * | 12/2016 | Macernis | E05B 47/004 |
| 9,637,236 | B2 * | 5/2017 | Vandewall | B64D 11/04 |
| 10,072,442 | B2 * | 9/2018 | Smith | E05B 41/00 |
| 10,087,664 | B2 * | 10/2018 | Auriac | E05C 3/122 |
| 2011/0304161 | A1 | 12/2011 | Behjat et al. | |
| 2012/0111069 | A1 * | 5/2012 | Padjen | E05C 5/04 70/91 |
| 2014/0331722 | A1 * | 11/2014 | Bridgewater | E05C 5/02 70/57 |
| 2014/0367974 | A1 * | 12/2014 | Keely | E05B 65/0014 292/60 |
| 2017/0043857 | A1 * | 2/2017 | Seibt | B64C 1/1407 |
| 2017/0356222 | A1 * | 12/2017 | Braz | E05C 1/04 |
| 2018/0094466 | A1 * | 4/2018 | Schneider | E05B 9/02 |
| 2018/0273157 | A1 * | 9/2018 | Hoogeveen | E05B 1/00 |

* cited by examiner

INTERMEDIATE STOWAGE RETAINER FOR AIRCRAFT MONUMENT STORAGE BAY

CROSS-REFERENCE TO RELATED APPLICATIONS

This application claims priority to U.S. Provisional Patent Application Ser. No. 62/361,460, entitled "Aircraft Galley Monument Systems, Apparatus and Methods for Use Thereof," filed Jul. 12, 2016 which is hereby incorporated by reference in its entirety.

BACKGROUND

The present disclosure relates to aircraft galley systems for commercial aircraft. In-flight catering services typically incorporate self-contained refrigeration units that are cooled to prevent spoilage of food prior to distribution to passengers, and to keep beverages at desired serving temperatures, as well as separate ovens for heating food in the preparation of hot meals to be served aboard aircraft. Currently space must be allocated for each of the heating and cooling devices separately, either in the same galley or in different galleys.

A modular aircraft galley may utilize several vertical and horizontal structural elements for accommodating slide-in devices or items of equipment such as galley inserts or galley appliances. The galley can include structural elements that form an essentially unchangeable basic element providing connection elements for the mechanical connection and interfacing of the slide-in devices or items of equipment, so that various kinds of the slide-in devices or items of equipment can be interchanged at various locations. Such modular aircraft galley systems typically use the outer case of a galley insert or galley appliance, such as an oven, refrigerator or other such device, as the principal mechanism for locating the galley insert or galley appliance in an inner cavity or liner of a galley.

SUMMARY OF ILLUSTRATIVE EMBODIMENTS

The forgoing general description of the illustrative implementations and the following detailed description thereof are merely exemplary aspects of the teachings of this disclosure, and are not restrictive.

In an illustrative embodiment, an intermediate retaining assembly secures a container within an aircraft galley compartment. The intermediate retaining assembly has a knob coupled to a first end of a rod where rotation of the knob causes rotation of the rod when the knob is pulled to an extended position. A retaining lever is coupled to a second end of the rod in which the retaining lever engages the rod when the connecting rod is pulled to the extended position such that rotation of the rod causes the retaining lever to rotate between a position for securing the container and a position for allowing insertion or release of the container from the compartment. A mounting plate is secured to an interior surface of the compartment that has recess to receive the retaining lever so that the retaining lever remains clear of the container being inserted into or released from the compartment.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

Figure 1:
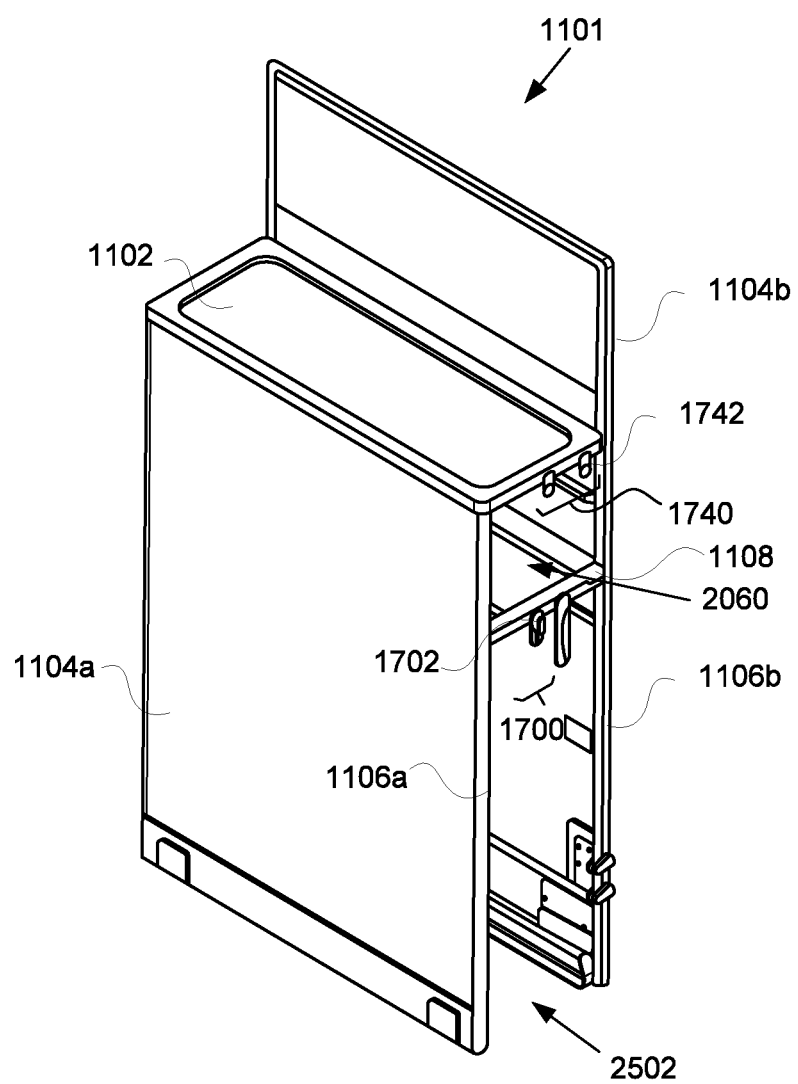
FIG. 1 illustrates a perspective view of a galley monument.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Aspects of the present disclosure may be directed to retaining or stopper assemblies for aircraft galley monuments. In some implementations, compartments disposed within the aircraft galley monuments, such as trolley bays or standard unit compartments, may be configured to secure various types of containers within the compartments. For example, a trolley bay may be sized to fit one or more horizontally stacked galley trolleys within the trolley bay where the trolleys may be inserted one-by-one through a forward opening in the compartment. In one example where two trolleys may be horizontally stacked within the trolley bay, a forward-most trolley may be secured within the trolley bay by a turn button assembly disposed on a front surface of the trolley bay that makes contact with a front surface of the trolley. In order to prevent jostling and inadvertent movement of a rearmost trolley within the trolley bay during turbulence events, crash events, or other types of unexpected movement of the aircraft or when a forward-most trolley has been removed from the trolley bay, the trolley bay may also include an intermediate stopper configured to secure the rearmost trolley within the trolley bay. In some examples, a position of the intermediate stopper may be adjusted by a user, such as a flight attendant, by a knob disposed on a front surface of the trolley bay that is coupled to a retaining lever by a connecting rod to allow the rearmost trolley to be secured within or released from the trolley bay independently of a securing mechanism for securing a forward-most trolley at a forward end of the trolley bay.

Figure 2:
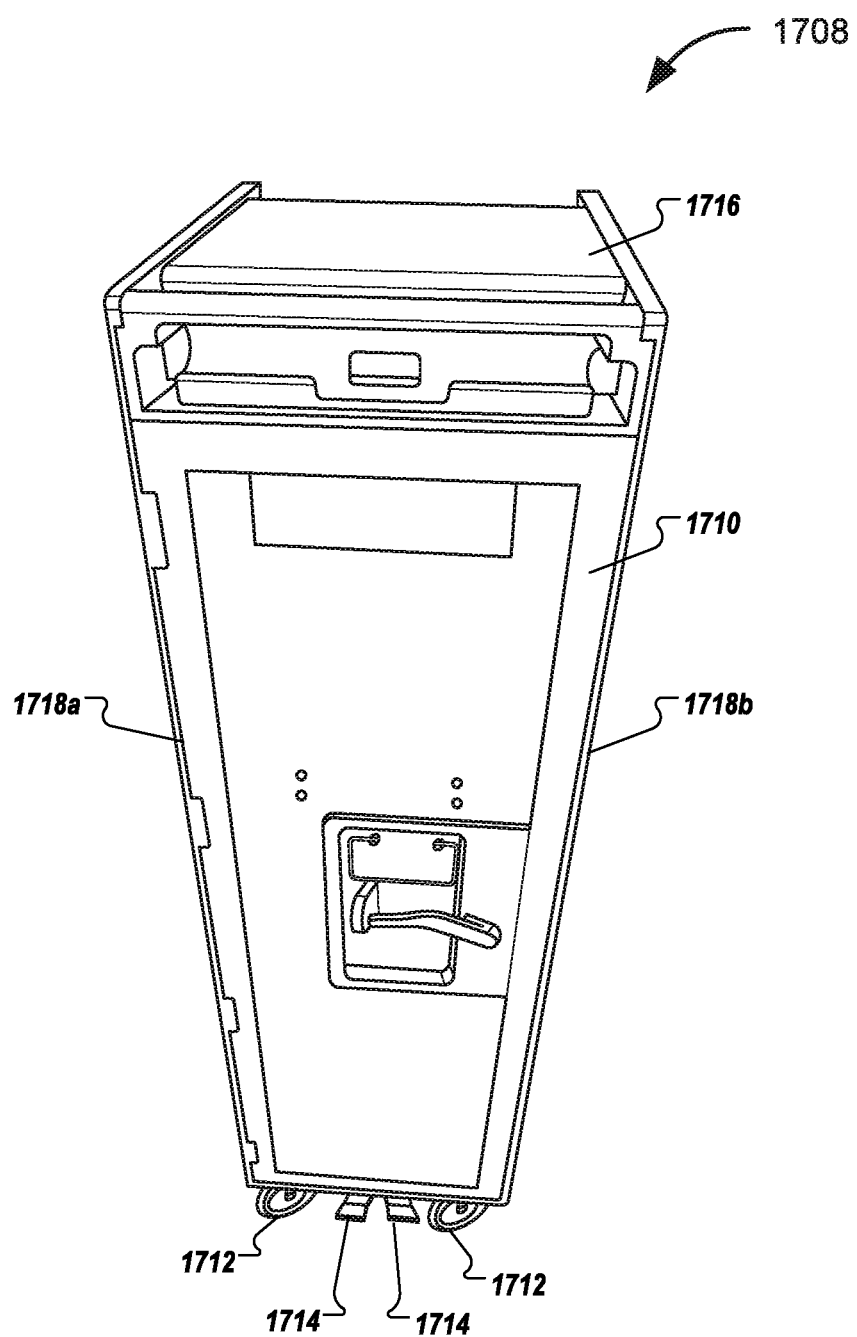
FIG. 2 illustrates a view of a trolley.

FIG. 1 illustrates a perspective view of an aircraft galley monument 1101 that may form at least a portion of a galley service area within an aircraft cabin, according to one example. In some implementations, the galley monument 1101 may include a work surface 1102 and a first side panel 1104a and a second side panel 1104b disposed on either side of the work surface 1102 such that the side panel 1104a and the side panel 1104b are connected by the work surface 1102. In one example, the galley monument 1101 may include a compartment 2060 with an enclosure configured for storage of at least one standard unit as well as a trolley bay 2502 with an enclosure configured for the storage of at least one trolley 1708 (as illustrated by FIG. 2). In the example of FIG. 1, the compartment 2060 may be disposed directly below a lower face of the work surface 1102, and the trolley bay 2502 may be disposed below a lower surface of the compartment 2060. In some examples, the compartment 2060 may be separated from the trolley bay 2502 by a dividing panel 1108, which forms a lower surface of the compartment 2060 and an upper surface of the trolley bay 2502. In some implementations, the side panels 1104a,b may form side walls of the compartment 2060 and the trolley bay 2502.

Similarly, the trolley bay 2502 may have a corresponding turn button assembly 1700 with at least one turn button 1702 that is configured to secure a trolley within the trolley bay 2502. In some implementations, the turn button assembly 1700 may include a turn button 1702 rotatably coupled to a front surface of the dividing panel 1108 that forms the upper surface of the trolley bay 2502 such that the turn button 1702 is positioned adjacent to a trolley 1708 (FIG. 2) that is inserted within the galley trolley bay 2502. In some examples, at least one turn button 1702b may be positioned near a vertical position of a center of gravity (COG) of the trolley 1708 to prevent fore/aft rotation (pitch) of the trolley 1708 within the trolley bay 2502 while experiencing flight or crash loads in a case where the turn button assembly 1700 is deployed in a first position and rotated such that a portion of the turn button 1702 is positioned in the path of the trolley 1708. For example, in the first position, the turn button 1702 may cover an upper portion of the trolley 1708 in order to prevent the trolley 1708 from sliding out of the trolley bay 2502. The first position of the turn button 1702 may also be referred to as a latched or secured position.

In some examples, the turn button 1702 may be rotated to a second position clear of the path of the trolley 1708 and toward the first or second side panel 1104a, 1104b of the galley trolley bay 2502, allowing the trolley 1708 to be released for withdrawal from the trolley bay 2502 for use as needed. The second position of the turn button 1702 may also be referred to as an unlatched or released position. In addition, the turn button 1702 may be mounted flush with a first front edge 1106a of the first side panel 1104a and a second front edge 1106b of the second side panel 1104 of the galley trolley bay 2502 so as not to project into a work space, for example, of the galley monument 1101.

In some implementations, each of the turn buttons or retaining devices (e.g., intermediate stopper 101) described herein may be designed to withstand predetermined crash loading requirements associated with trolleys and standard units. In examples where multiple adjacently mounted turn buttons are configured to cooperatively secure a trolley or other type of container within a compartment or trolley bay, each of the adjacently mounted turn buttons is designed to individually secure the trolley or container within the compartment or trolley bay under the predetermined crash loads to take into account failure of one or more of the adjacently mounted turn buttons. In one example, the design crash loading for the turn buttons may correspond to approximately 9G times a weight of the trolley/standard unit, which for full a trolley may be 120 kg (two times a half-size trolley) and for a full standard unit may be 50 kg (accounting for two standard units). In addition, an empty trolley may weigh approximately 11 kg, and an empty standard unit may have a maximum weight of approximately 2 kg.

Further, steps for a method of trolley 1708 retention may include rotating (or verifying rotated) the turn button 1702 of the turn button assembly 1700 into the second (release) position, inserting a trolley 1708 into a galley trolley bay 2502 toward a rear surface (not shown) of the galley trolley bay 2502 until a front surface 1710 of the trolley 1708 is substantially flush with front surfaces of the trolley bay 2502 (e.g., front surfaces of the side panels 1104*a,b* and dividing panel 1108), and deploying a turn button assembly 1700 by rotating the turn button 1702 from the second position to the first position to secure the trolley 1708 and prevent motion of the trolley 1708 within the trolley bay 2502. A complementary method of releasing the trolley 1708 includes rotating the turn button assembly 1700 to the second position to release the trolley 1708 by positioning the turn button 1702 such that the turn button 1702 may not be in contact with the trolley 1708, and removing the trolley 1708 from the galley trolley bay 2502 by slidingly withdrawing the trolley 1708 from the galley trolley bay 2502. In some examples, the turn button assembly 1700 may be mounted such that the turn button assembly 1700 is flush with the galley monument and out of the way when in a position to release or receive a trolley 1708. In some examples, the compartment 2060 may have a turn button assembly 1740 having at least one turn button 1742. The turn button assembly 1740 and the turn button 1742 of the compartment 2060 and corresponding method of use may in some cases be identical to the turn button assembly 1700 and the turn button 1702, respectively.

Lastly, a trolley bay 2502 may also include a dual paddle latch 194 or a trolley bay door 1400 to secure the trolley 1708 to the trolley bay 2502 as illustrated by FIGS. 6A-6E, discussed in further detail below.

FIG. 2 illustrates a view of a trolley 1708 that may be inserted into the galley trolley bay 2502, according to one example. In some implementations, the trolley 1708 may include casters 1712 disposed below a bottom surface of the trolley 1708 that allow the trolley 1708 to be maneuvered by a user, for example, a flight attendant. For example, the casters 1712 may allow the trolley 1708 to be rolled in a desired direction into or out of the trolley bay 2502. Further, the casters 1712 may also be secured by foot brakes 1714 connected to the trolley 1708. In some implementations, the foot brakes 1714 may be engaged to lock the casters 1712 to prevent the trolley 1708 from inadvertently rolling, and disengaged to allow rolling as desired. In some implementations, the trolley 1708 may be designed to fit snugly within the trolley bay 2502 while still being able to slide smoothly into and out of the trolley bay 2502 (FIG. 1). For example, an upper surface 1716 of the trolley 1708 may abut or be disposed adjacent to a lower face of the dividing panel 1108 separating the trolley bay 2502 from the compartment 2060. Additionally, side surfaces 1718*a,b* may abut or be disposed adjacent to inner surfaces of the first and second side panels 1104*a,b*. The trolley 1708 may be secured within the trolley bay 2502 of the galley monument 1101, in some examples, by at least one turn button 1702 of a turn button assembly 1700.

Figure 3A:
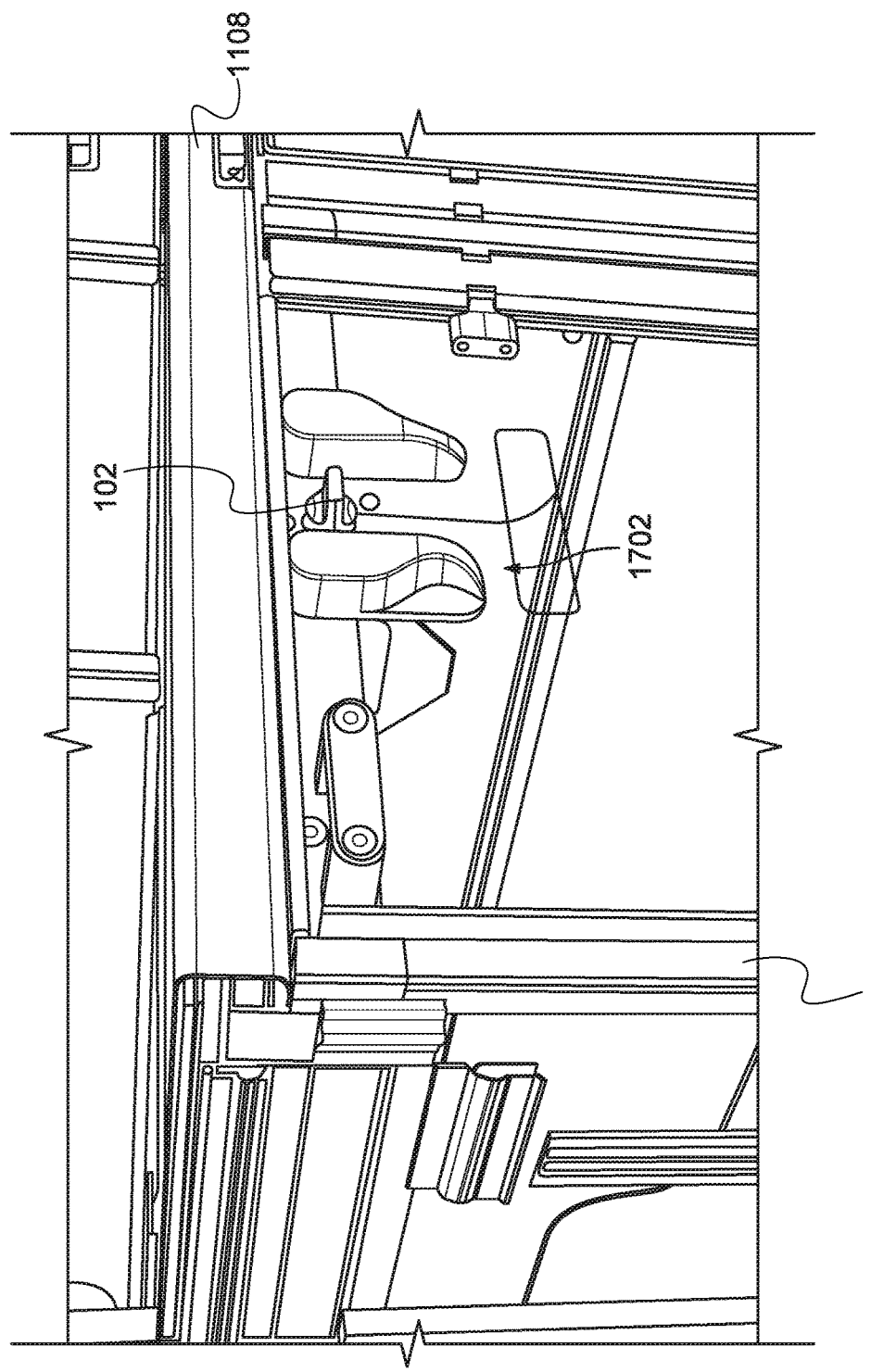
FIG. 3A illustrates a perspective view of a galley turn button.

FIG. 3A illustrates a perspective view of a turn button 1702 for a galley turn button assembly 1700, according to one example. In some implementations, the turn button 1702 may be used for releasably retaining a container in bays or compartments capable of holding two or more containers back-to-back (e.g. two or more deep in a bay or compartment). Examples of containers may include a trolley such as trolley 1708 of FIG. 2, within a trolley bay compartment of a galley monument such as galley monument 1101 of FIG. 1, and a standard unit container within a compartment 2060. The galley turn button 1702 may be rotatably mounted with or near, and pivot about, an edge of a surface, such as that of a work surface 1102, a side panel 1104*a* or side panel 1104*b*, or dividers between compartments within a galley. In one example, the galley turn button 1702 may be connected to a substantially horizontal surface such as the dividing panel 1108 and extend downward in a first, substantially vertical position to hold a trolley 1708 in place within a trolley bay such as trolley bay 2502 of FIG. 1, and may be rotated to a second, substantially horizontal position to allow the trolley 1708 to be slideably rolled into or out of the galley trolley bay. In some implementations, an actuating knob 102 may be positioned adjacent to a turn button 1702, or between any two turn buttons of a turn button assembly, to allow for control of an intermediate stopper 101 as will be discussed in detail further below.

Figure 4A:
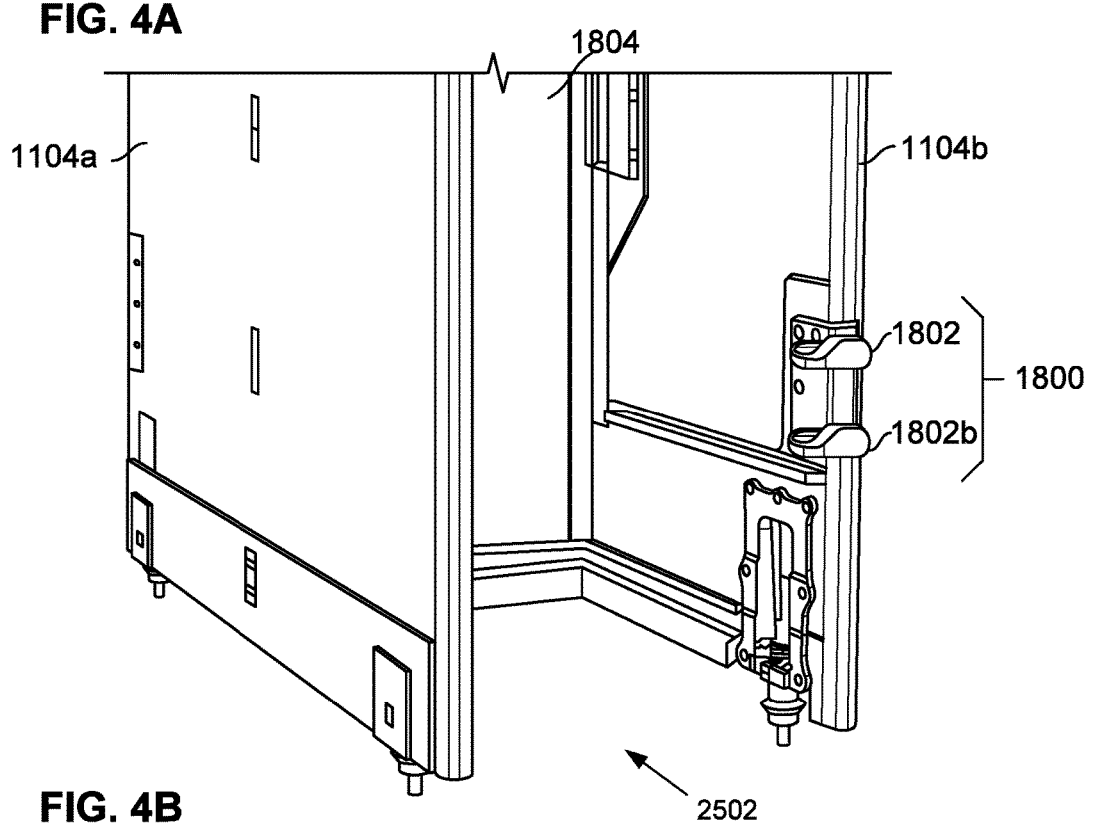
FIGS. 4A-4B represent perspective views of a turn button assembly connected to a substantially vertical side panel.
Figure 4B:
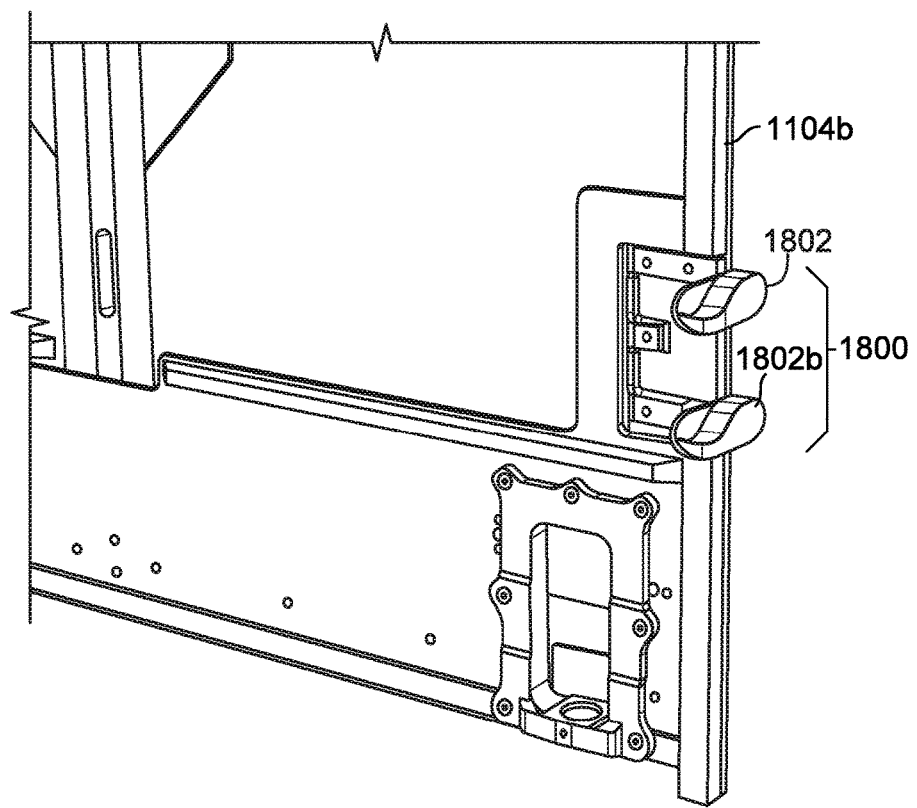

In other embodiments, a galley turn button assembly, such as the turn button assembly 1700 (FIG. 1) may be configured for connection to a substantially vertical surface of a galley monument adjacent to a trolley bay such as illustrated by FIGS. 4A-4B. FIGS. 4A-4B represent perspective views of a turn button assembly 1800 connected to a substantially vertical side panel 1104*b*, according to one example. The turn button assembly 1800 may include a turn button 1802 rotatably connected to a galley trolley bay 2502 and located adjacent to a trolley positioned within the galley trolley bay 2502. The galley turn button 1802 may be connected to a surface such as the side panel 1104*a* and/or side panel 1104*b*, and extend in a first, substantially horizontal position to hold a trolley 1708 (as illustrated by FIG. 2) in place within a trolley bay 2502, and may be set in a second, substantially vertical position to allow the trolley 1708 to be rolled into or out of the galley trolley bay 2502.

Further, a second turn button 1802*b* may also be rotatably connected to the galley trolley bay 2502, located close to the turn button 1802. The turn button 1802*b* may move synchronously with the turn button 1802 to provide additional retention force on the trolley 1708. In some implementations, the turn button 1802*b* may be connected to the galley trolley bay 2502 via a gear or linkage mechanism. In some examples, the turn button assembly 1800 mounted to the side panel 1104*a* and/or 1104*b* may be installed to prevent a half-sized trolley from rotating out from under the turn button assembly 1700 mounted to the dividing panel 1108 above the trolley bay 2502. In addition, the turn button assembly 1800 may be installed for trolley bays that may not include an outer panel door.

Further, steps for a method of trolley 1708 retention may include rotating (or verifying rotated) the turn buttons 1802 of the of the turn button assembly 1800 into the second position (unlatched), inserting a trolley 1708 into a galley trolley bay 2502 toward a rear surface of the galley trolley bay 2502 until a front surface 1710 of the trolley 1708 is substantially flush with front surfaces of the trolley bay 2502 (e.g., front surfaces of the side panels 1104*a,b* and dividing panel 1108), and deploying the turn buttons 1802*a,b* of the turn button assembly 1800 by rotating the turn buttons 1802*a,b* from the second position to the first position to secure the trolley 1708 and prevent motion of the trolley 1708 within the trolley bay 2502. A complementary method of releasing the trolley 1708 includes rotating the turn buttons 1802*a,b* of the turn button assembly 1800 to the second position to release the trolley 1708 by positioning the turn button 1702 such that the turn button 1702 may not be in contact with the trolley 1708 (e.g., rotating the turn buttons 1802 vertically), and removing the trolley 1708 from the galley trolley bay 2502 by slidingly withdrawing the trolley 1708 from the galley trolley bay 2502. In some examples, the turn button assembly 1800 may be mounted such that the turn button assembly 1800 is flush with the galley monument and out of the way when in a position to release or receive a trolley 1708.

Figure 3B:
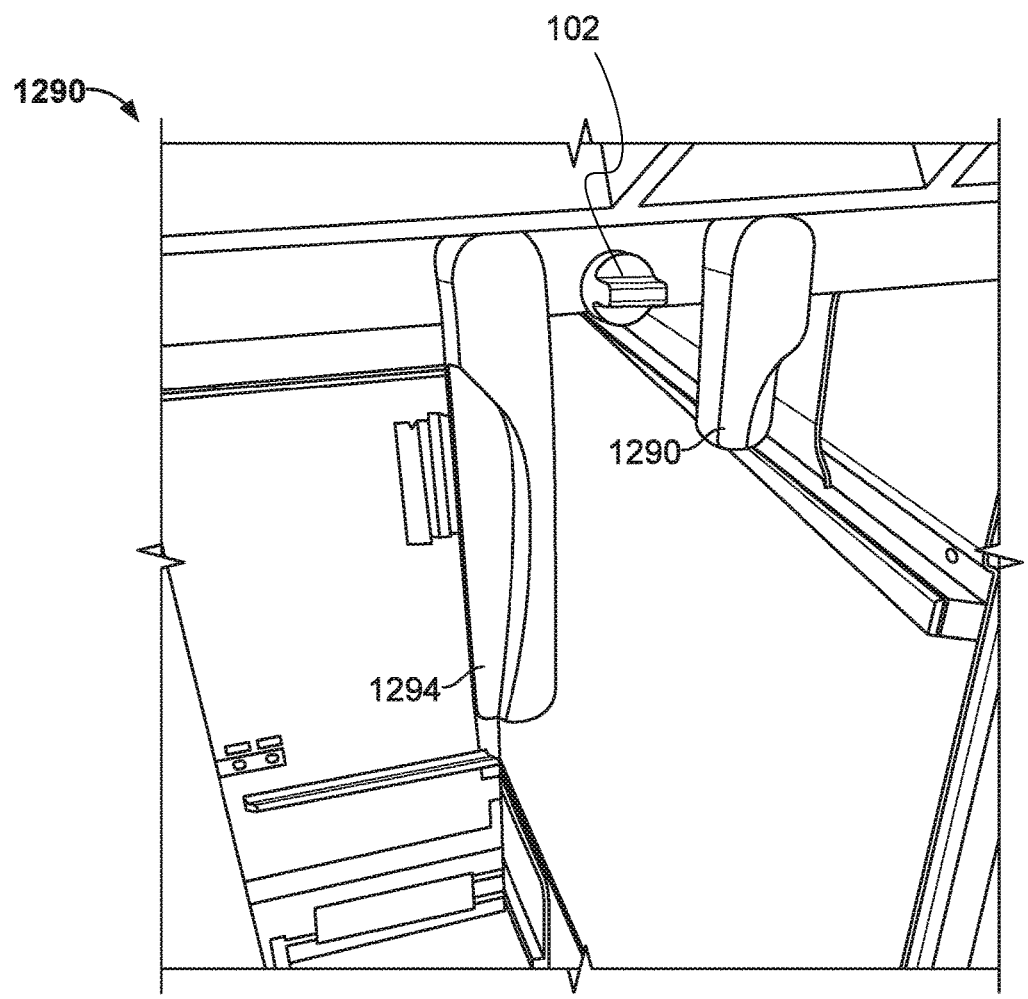
FIGS. 3B-3C represent front and rear views of a galley turn button.
Figure 3C:
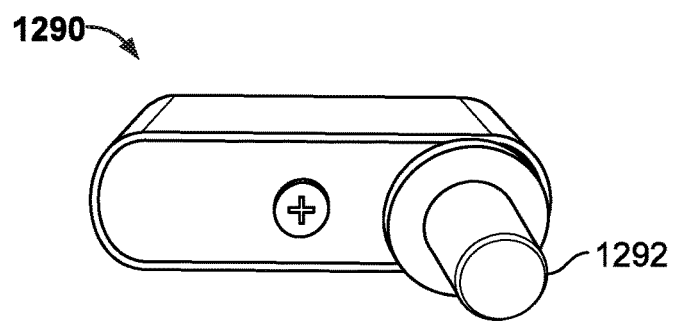

Turning to FIGS. 3B-3C, front and rear views of galley turn buttons 1290 and 1294 having different lengths are depicted, according to an example embodiment for releasably retaining a trolley, such as the trolley 1708 discussed above, within a trolley bay compartment of a galley monument such as the trolley bay 2502 of the galley monument 1101 described above (FIG. 1). In some implementations, the turn buttons 1290, 1294 may be implementations of the turn buttons 1702, 1802*a,b* described above. In some examples, as shown in FIG. 3C, the galley turn button 1290, as well as galley turn button 1294, may include a securing bolt 1292 mounted at one end of the galley turn button 1290. The securing bolt 1292 may be rotatably coupled to and pivot about an edge of a surface, such as that of a work surface 1102, a side panel 1104*a,b*, or dividing panel 1108 of the galley monument 1101 (FIG. 1). In some implementations, the galley turn buttons 1290, 1294 may serve as a load bearing body and a cover may be fitted over the galley turn buttons 1290, 1294 for aesthetic and ergonomic purposes. The shape of the cover may provide ease of operation for a user and replacement in the event of damage or if color fades or otherwise changes. In one example, the galley turn buttons 1290, 1294 may be rotated vertically and extend downward in a first position to hold a trolley 1708 in place within a galley trolley bay 2502, and may be set in a second, horizontal position to allow the trolley 1708 to freely roll into or out of the galley trolley bay 2502. In one example, the galley turn buttons 1290, 1294 may include a steel alloy and the cover may include an anodized aluminum alloy. The galley turn buttons 1290, 1294 and therefore the cover may be formed with at least as long a length as needed to secure the trolley 1708 within the trolley bay 2502. In some implementations, the turn button 1294 may have a longer length than the turn button 1290 in order to secure an outer door of the trolley 1708 in a closed position in order to prevent the contents of the trolley 1708 from being ejected from the trolley 1708 during a crash event. However, rotating the longer turn button 1294 to the release position while the shorter turn button 1290 is in the secured position may allow access to the contents of the trolley 1708 while still retaining the trolley 1708 within the trolley bay 2502 by the shorter turn button 1290.

Additional information regarding turn button design is provided and further described in related U.S. patent application Ser. No. 15/647,193 entitled "Aircraft Service Trolley and Galley Enclosure Therefor" and filed Jul. 11, 2017, hereby incorporated by reference in its entirety.

Figure 5A:
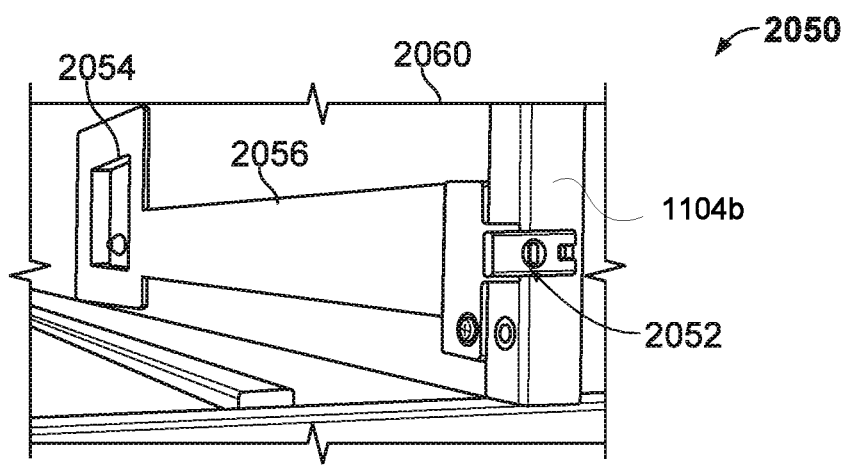
FIGS. 5A-5B illustrate a retention apparatus for retaining standard unit containers within galley monument compartments.
Figure 5B:
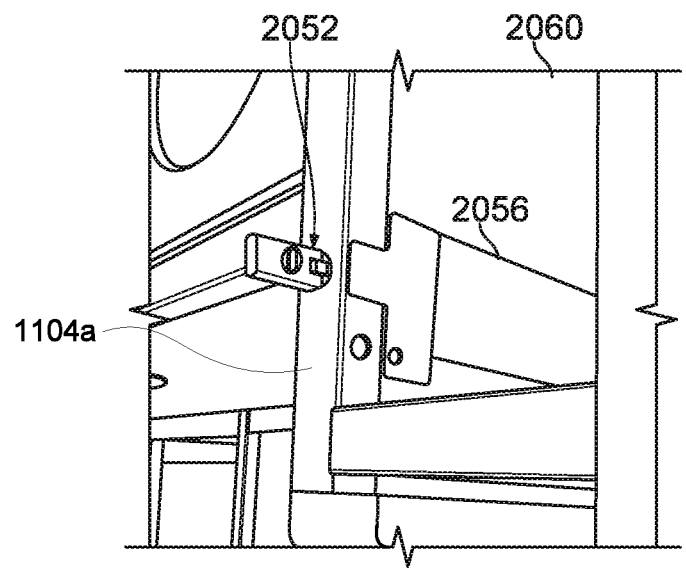

FIGS. 5A-5B illustrate a retention apparatus 2050 for retaining standard unit containers within galley monument compartments, according to one example. In some implementations, multiple standard unit containers may be stackably inserted in a horizontal direction into a compartment 2060 (FIG. 1). For example, a first standard unit container (not shown) may be inserted from a front side of a compartment 2060 of a galley monument 1101 (as illustrated by FIG. 1) and inserted toward a rear side of the compartment 2060. A second standard unit container (not shown) may be inserted into the compartment 2060 from the front side and positioned adjacent to the first standard unit toward the front side of the compartment 2060 such that the first standard unit container may not be removed from the compartment 2060 unless the second standard unit container is removed first. In some examples, the retention apparatus 2050 may be disposed along at least a portion of a width of inner surfaces of side panels 1104*a,b* and may be designed to pivot to secure, and prevent unintended movement of, the first standard unit container within the compartment 2060.

In some implementations, the retention apparatus 2050 may include a front actuator 2052, an intermediate retainer 2054, and a connection member 2056 between the front actuator 2052 and the intermediate retainer 2054. The connection member 2056 may be rotatably positioned within a side wall 1104*a,b* of the compartment 2060, connected at a first end to the front actuator 2052, and connected at a second end to the intermediate retainer 2054. In some examples, the intermediate retainer 2054 may be located approximately midway between the front side and the back side of the compartment 2060. Rotation of the front actuator 2052 about the longitudinal axis of the connection member 2056 cause rotation of the intermediate retainer 2054 from a first, approximately vertical position flush with the side panel 1104*a* or side panel 1104*b* of the compartment 2060 to a second, approximately horizontal position where the intermediate retainer 2054 may be in position to secure the first standard unit container from sliding. For example, the connection member 2056 may cause cooperative rotation of the front actuator 2052 and intermediate retainer 2504 such that a rotation angle of the front actuator 2052 is indicative of a rotation angle of the intermediate retainer 2504.

Rotation of the front actuator 2052 in an opposite direction may also cause rotation of the front actuator 2052 from the second position to the first position, allowing the first standard unit container to be removed from the compartment 2060. The front actuator 2052 may be, for example, a folding lever, a knob, or other actuator that may be positioned to prevent impact with a standard unit container and allow access the compartment 2060. In implementations where the front actuator 2052 is a folding lever, the folding lever may fold outward to allow for operation of the folding lever by providing a grip for a thumb and forefinger but can also be folded flat to avoid contact with an open door of an adjacent compartment.

Figure 6A:
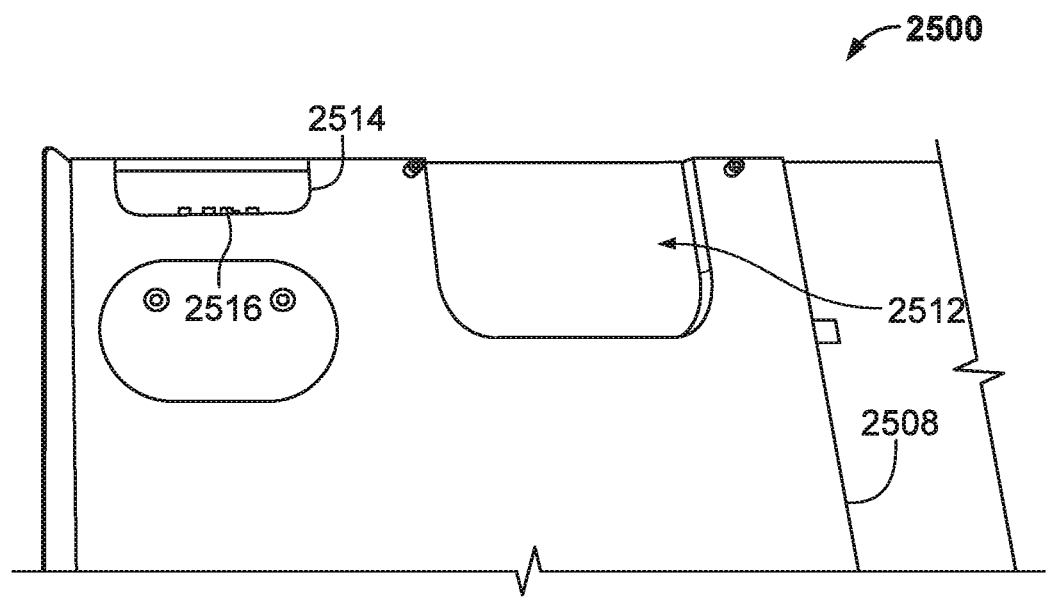
FIGS. 6A-6E represent various views of a closure prevention system.
Figure 6B:
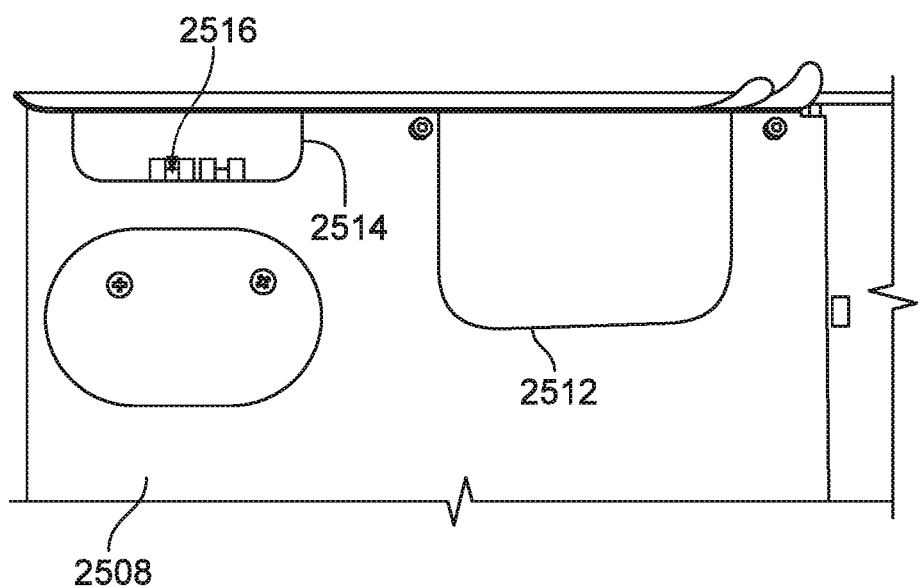
Figure 6C:
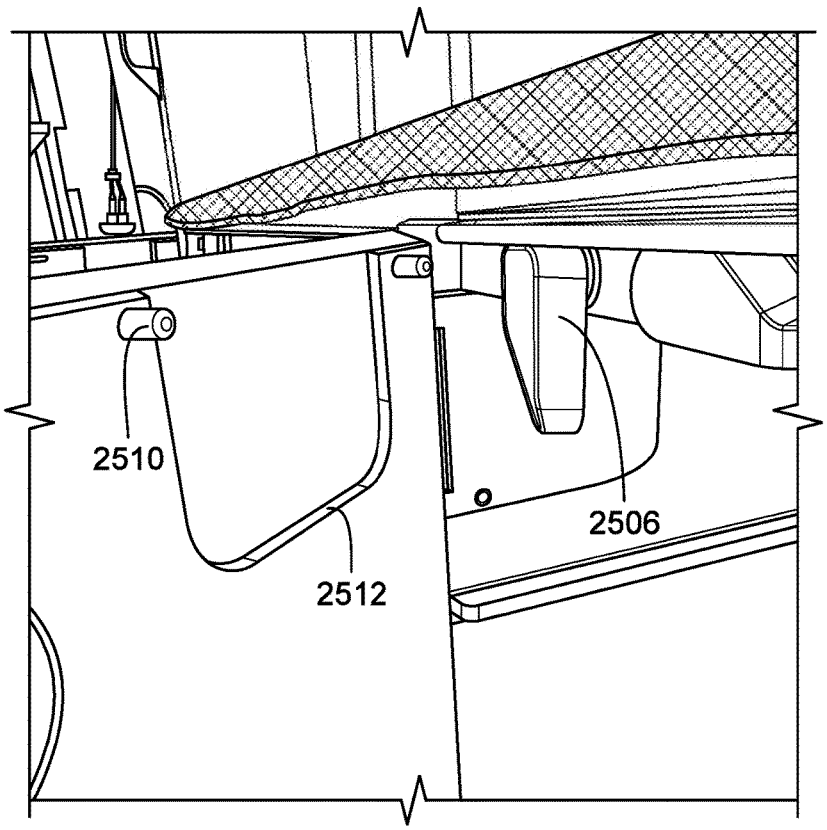
Figure 6D:
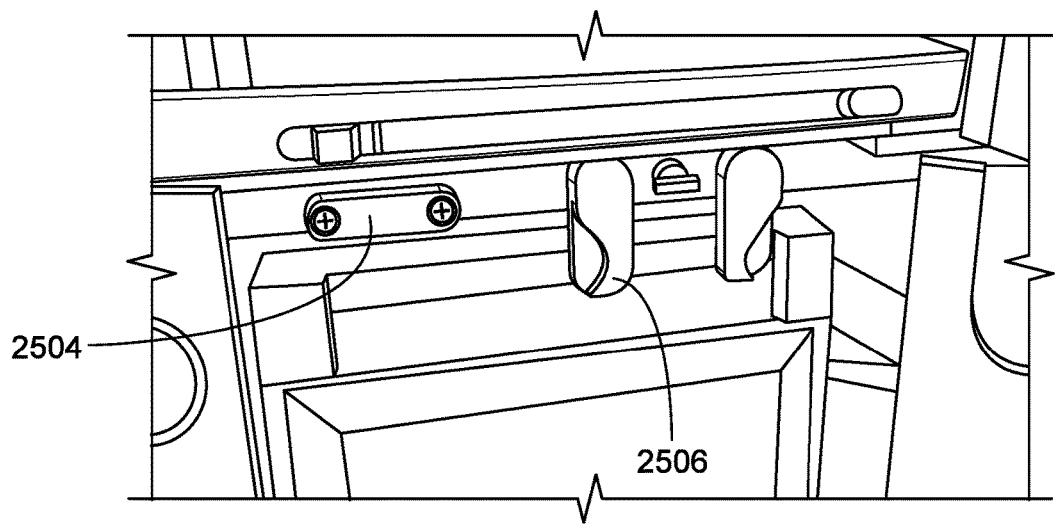
Figure 6E:
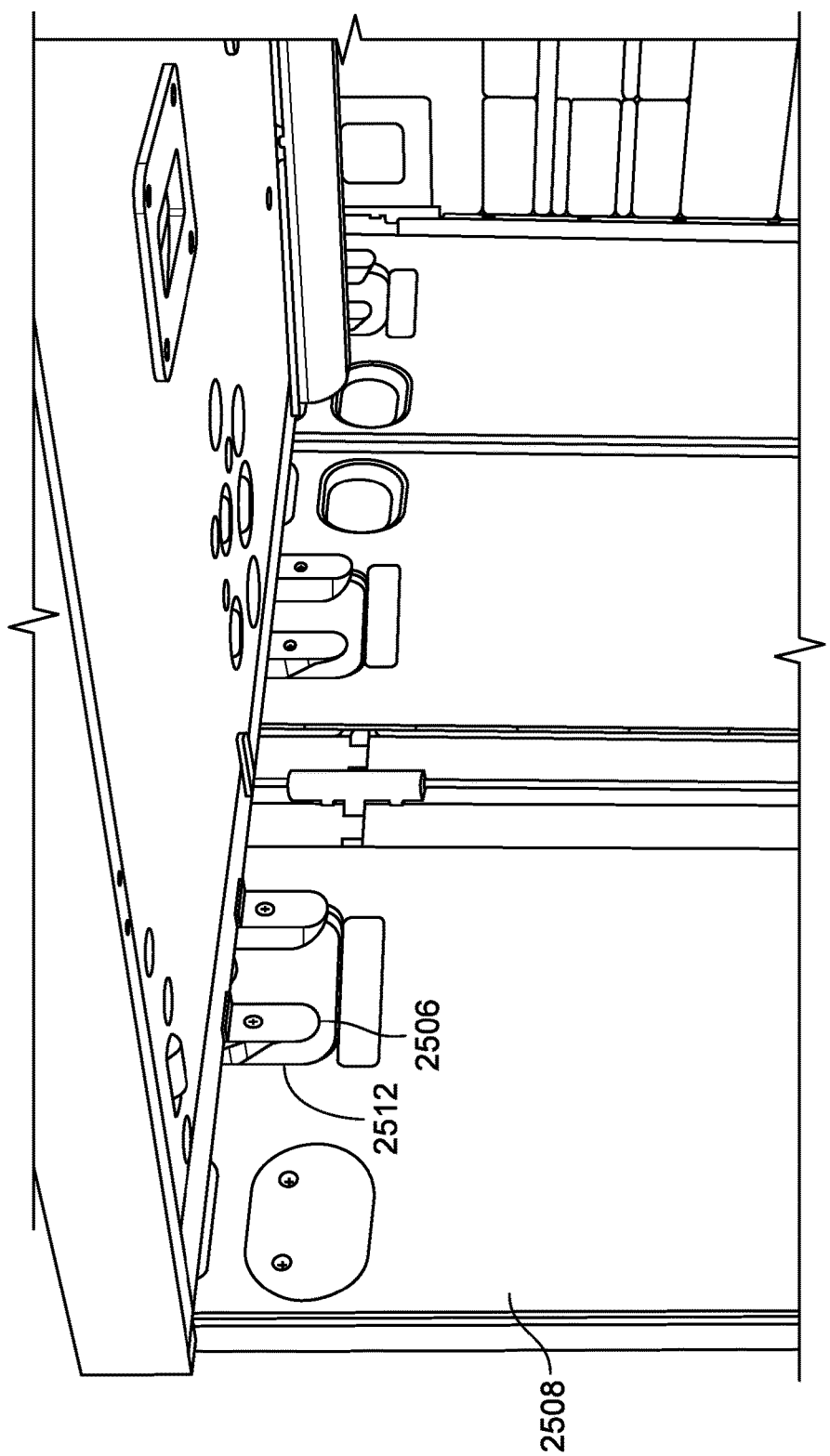

FIGS. 6A-6E represent various views of a closure prevention system 2500 for a galley monument, according to one example. In some implementations, the closure prevention system 2500 may be implemented for the trolley bay 2502 of the galley monument 1101 (FIG. 1). The closure prevention system 2500 may include a bay door 2508 hingedly connected to a trolley bay 2502. The trolley bay 2502 may include a door latch bar 2504 and a turn button 2506 (as illustrated by FIG. 6D). The bay door 2508 may also include a door stop 2510, a turn button recess 2512, a latch recess 2514, and a door latch pawl 2516. The door stop 2510, the turn button recess 2512, and the latch recess 2514 may be disposed on an inner surface of the bay door 2508 to enclose at least a portion of the turn button 2506 and the door latch bar 2504, respectively, in a case where the bay door 2508 is fully closed against the trolley bay 2502. In some examples, the door latch pawl 2516 may be positioned within the latch recess 2514.

If an attempt is made to close the bay door 2508 and the turn button 2506 is in a first position to allow a trolley 1708 to be inserted or removed from the trolley bay 2502, the bay door 2508 cannot be secured nor fully closed due to interference that may occur when the door stop 2510 impacts the turn button 2506 as the bay door 2508 is closed, and prevent the door latch pawl 2516 from fully connecting with the door latch bar 2504.

If an attempt is made to close the bay door 2508 and the turn button 2506 is in a second position to prevent the trolley 1708 from being inserted or removed from the trolley bay 2502, the bay door 2508 may be secured to the trolley bay 2502 and fully closed as the door stop 2510 has sufficient clearance so as not to impact the turn button 2506, allowing the door latch pawl 2516 to fully connect with the door latch bar 2504.

If the bay door 2508 is in a fully closed position, the door latch bar 2504 may be retained within the latch recess 2514 and the door latch bar 2504 connected to the door latch pawl 2516. The door latch pawl 2516 secures the bay door 2508 to the trolley bay 2502 and provides an amount of resistance against opening of the bay door 2508.

In one example, the trolley bay 2502 may include more than one turn button 2506. In another example, the bay door 2508 may include more than one door stop 2510. In another example, the bay door 2508 may include more than one door latch pawl 2516.

FIGS. 7-13 provide an illustrative example of an intermediate stopper 101 for retaining a container within a compartment of an aircraft galley monument, such as the trolley bay 2502 of the galley monument 1101 (FIG. 1). In some implementations where multiple containers are horizontally stacked between a front surface and a rear surface of the trolley bay 2502, the intermediate stopper 101 may be used to retain a trolley 1708 or other container inserted toward a rear portion of the trolley bay 2502 such that a front surface of the trolley 1708 that may not make contact with a turn button assembly (e.g., turn button assembly 1700 in FIG. 1) disposed at a front end of the trolley bay 2502. In one example where the trolley bay 2502 is configured to hold two horizontally stacked trolleys in which a first trolley is in front of the second trolley, the intermediate stopper 101 may be configured to secure the second trolley within a rear portion of the trolley bay 2502. Additionally, while the intermediate stopper 101 may be used to secure the second (rear) trolley, a rotational position of the intermediate stopper 101 may be controllable by a user by rotating an adjustable knob, such as actuating knob 102, that may be disposed on a front surface of the trolley bay 2502 adjacent to or between turn buttons of a turn button assembly (e.g., turn button assembly 1700 in FIG. 1) that may be used to secure the first (forward) trolley within the trolley bay 2502. In some implementations, the stopper assembly 101 may secure the second (rear) trolley independently of operation of the turn button assembly 1700 for securing the first (forward) trolley at a forward end of the trolley bay 2502.

Figure 7:
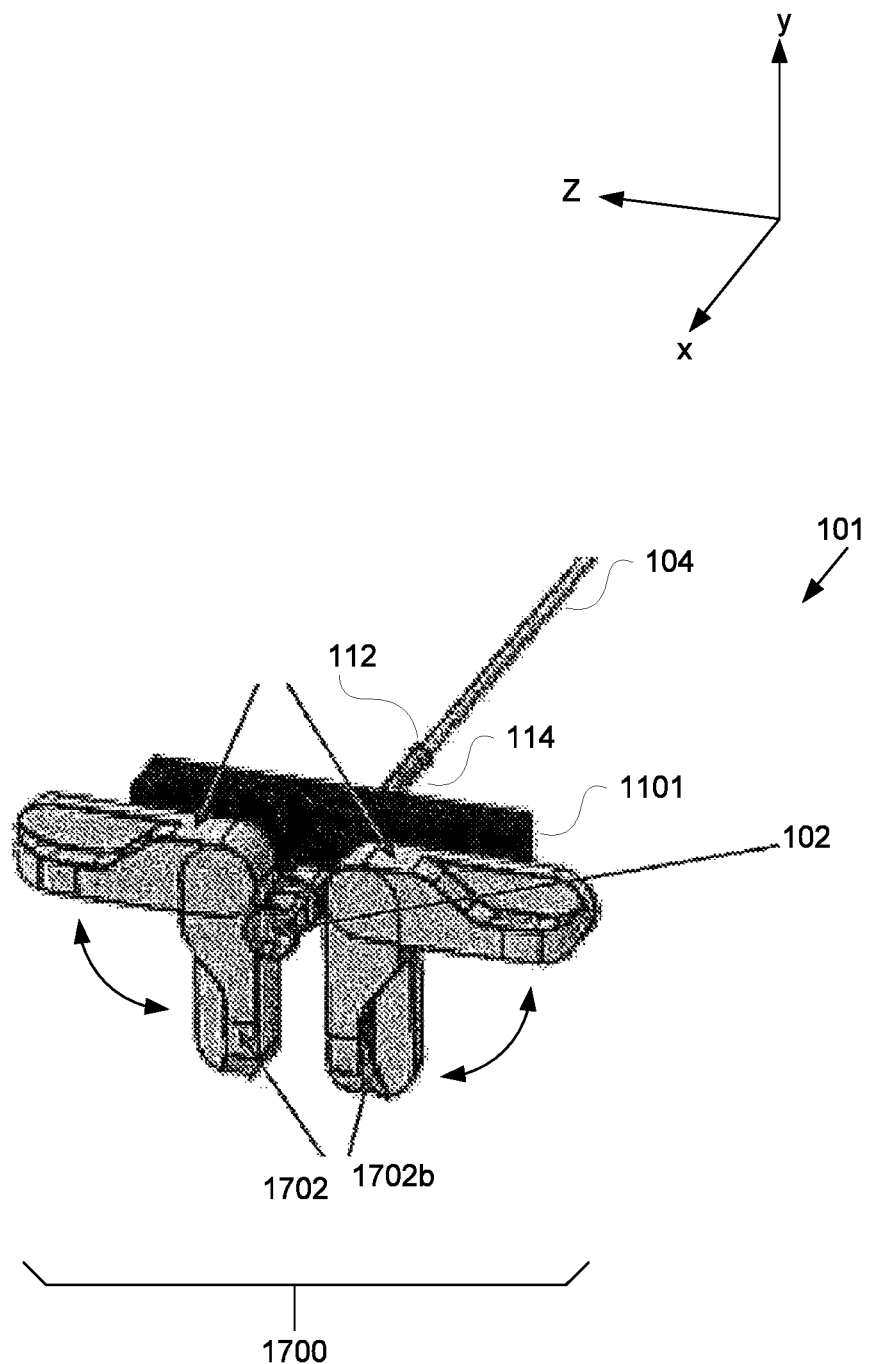
FIG. 7 illustrates a first end of an intermediate retaining assembly connected to a surface of a monument and including a turn button assembly.

For example, FIG. 7 illustrates a front or forward portion of an intermediate stopper 101 connected to a front surface of a monument 1101 and including a turn button assembly 1700, according to one example. In some implementations, a trolley bay of a galley monument, such as the trolley bay 2502 of the galley monument 1101 (FIG. 1) may include the intermediate stopper 101 having components such as an actuating knob 102 disposed on a front surface of the galley monument, a connecting rod 104 passing through the front surface of the galley monument and coupled at a first end to the actuating knob 102, spring 114, stop collar 112, as well as other components discussed further below.

In some implementations, the first (front) end of the intermediate stopper 101 may be positioned through and supported by the surface or edge of the monument 1101, for example an edge of a work surface 1102 or dividing panel 1108, and coupled to an actuating knob 102. In some implementations, the actuating knob 102 may be positioned between or adjacent to turn buttons of the turn button assembly 1700. For example, the turn button assembly 1700 may include a first turn button 1702 and a second turn button 1702b, and the actuating knob 102 may be positioned between the first turn button 1702 and the second turn button 1702b. Positioning the actuating knob 102 between the first turn button 1702 and second turn button 1702b may keep the actuating knob 102 out of the way when not in use and also make the actuating knob 102 less accessible, which may prevent inadvertent operation of the turn knob 102. In addition, a spring 114 may be positioned around a connecting rod 104 between the surface of the monument 1101 and a stop collar 112 connected to the connecting rod 104 to keep the actuating knob 102 in a retracted position close to or within the monument 1101 when the intermediate stopper 101 is not in use.

Each of the turn button 1702 and the turn button 1702b is shown in two different positions: A substantially horizontal and a substantially vertical position. The turn button 1702 rotates about an x-axis from a substantially vertical position to a substantially horizontal position in a clockwise motion. In some implementations, the turn button 1702b may rotate about an x-axis from a substantially vertical position to a substantially horizontal position in a counterclockwise motion. In another example, each of the turn buttons 1702, 1702b may be configured to rotate in both the clockwise and counterclockwise directions.

In some examples, the actuating knob 102 may be connected to a first end of the connecting rod 104 and a spring 114 may be positioned around the connecting rod 104. The connecting rod 104 may rotate about an x-axis while the actuating knob 102 may move or change position axially along the x-axis. This allows a user to grasp and operate the actuating knob 102 as needed by pulling the actuating knob 102 outward into an extended use position away from a stowed (retracted) position abutting a front surface of the galley monument 1101 between the turn button 1702 or turn button 1702b, which allows for twisting of the actuating knob 102 in order to adjust a rotational position of the intermediate stopper 101.

In one example, the turn button assembly 1700 may be connected to a front edge of a substantially horizontal surface such as the edge of the work surface 1102 or dividing panel 1108 (as illustrated by FIG. 1) of the monument 1101. A substantially horizontal position of the turn button 1702 or the turn button 1702b may allow the turn button assembly 1700 to release a trolley or standard unit from the monument 1101. A vertical position of the turn button 1702 or the turn button 1702b may allow the turn button assembly 1700 to secure a trolley or standard unit within the trolley bay 2502 (as illustrated by FIG. 1).

In another example, the turn button assembly 1700 may be connected to a vertical surface such as the side panel 1104a (as illustrated by FIG. 1) and/or side panel 1104b of the monument 1101. A substantially horizontal position of the turn button 1702 or the turn button 1702b may allow the turn button assembly 1700 to secure the trolley or standard unit within the trolley bay 2502 of the monument 1101. A substantially vertical position of the turn button 1702 or the turn button 1702b would allow the turn button assembly 1700 to release the trolley or standard unit from within the trolley bay 2502.

Figure 8:
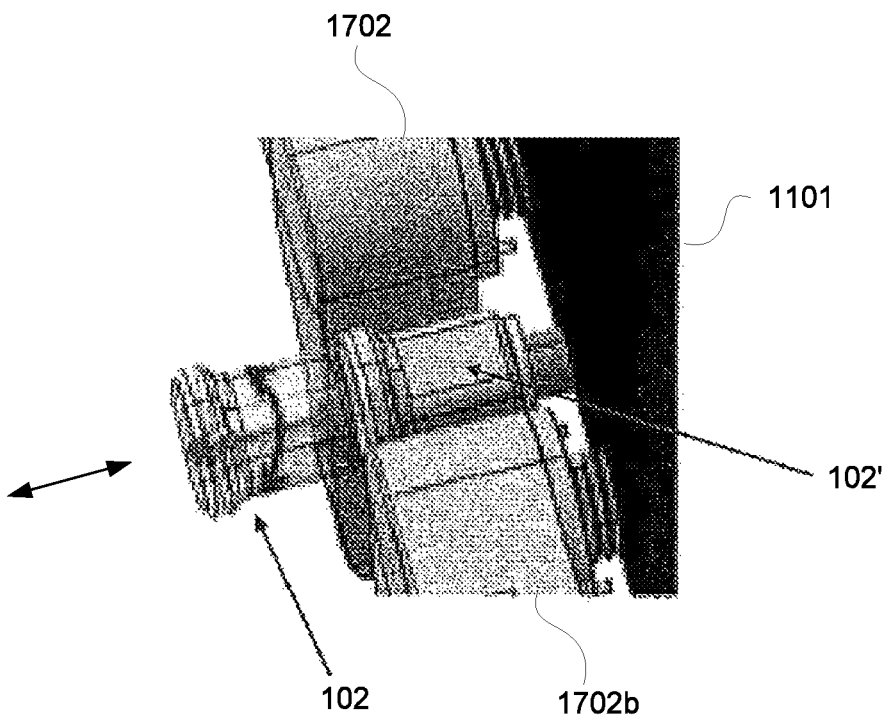
FIG. 8 is another view of an end of the intermediate retaining assembly.

FIG. 8 illustrates another view of an end portion of the intermediate stopper 101, according to one example. In some implementations, the actuating knob 102 is disposed at the end of the intermediate stopper 101 and may provide for adjustment of a position of the intermediate stopper 101. The actuating knob 102 is shown in a first, retracted or stowed position (shown as 102' in FIG. 8) between the first turn button 1702 and the second turn button 1702b of the turn button assembly 1700, and in a second, extended position (shown as 102 in FIG. 8). When in the second extended or use position, a user may grip the actuating knob 102 and rotate the actuating knob 102 in either a clockwise or counterclockwise direction depending on where the intermediate stopper 101 is located and how the intermediate stopper 101 is connected to the monument 1101. Upon release, the actuating knob 102 may revert to the first, retracted position due to spring tension from the spring 114, as illustrated by FIG. 7.

Figure 9A:
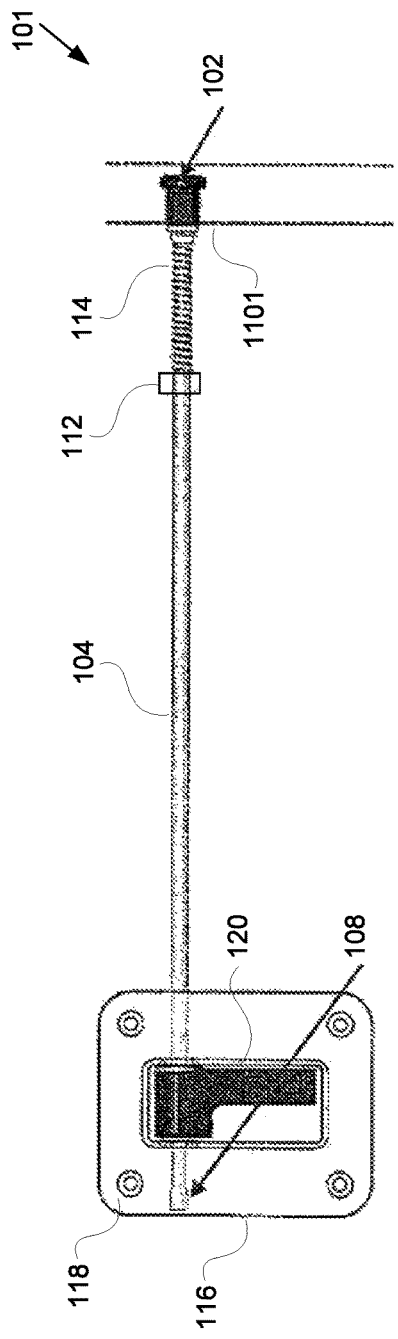
FIGS. 9A-9B illustrate side views of the intermediate retaining assembly with the actuating knob in a first, retracted position, and the actuating knob in a second, extended position.
Figure 9B:
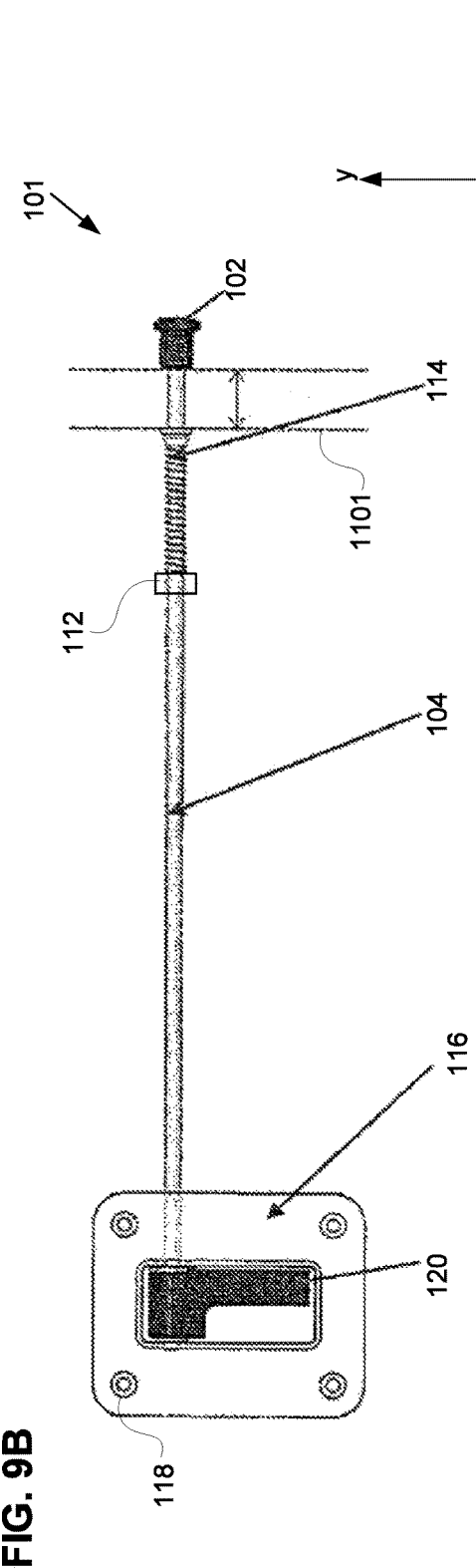

FIGS. 9A-9B illustrate side views of the intermediate stopper 101 with the actuating knob 102 in a first, retracted position (FIG. 9A), and the actuating knob 102 in a second, extended position (FIG. 9B), according to one example. In some implementations, the connecting rod 104 may be connected at a first end to an actuating knob 102 and/or a surface of the monument 1101 and at a second end to a retaining lever 120. In some implementations where two trolleys are horizontally stacked end-to-end within the trolley bay 2502, the connecting rod 104 may have a length corresponding to approximately half a distance between a front surface and a rear surface of the trolley bay 2502 such that the retaining lever 120 is positioned about midway between the front surface and rear surface of the trolley bay in order to secure the rearmost trolley 1708 positioned behind a forward-most trolley 1708 that is adjacent to a front surface of the trolley bay 2502. In one example, the retaining lever 120 may be rotatably coupled to the mounting plate 116. In some implementations, the mounting plate 116 may be connected to a stationary surface, such as a surface of the monument 1101, the side panel 1104a, or the side panel 1104b (as illustrated by FIG. 1). The mounting plate 116 may have a cutout or recess having a shape that is complementary with a shape of the retaining lever 120, and may have a contoured surface within which to accommodate the retaining lever 120 and support the second end of the connecting rod 104. For example, when the retaining lever 120 is rotated to an orientation that corresponds to an orientation of the mounting plate 116, the retaining lever 120 may fit within the cutout of the mounting plate 116, which provides for insertion or release of a trolley secured by the retaining lever 120 of the intermediate stopper 101. In one example, the retaining lever 120 is made of a high strength alloy. The spring 114 surrounding the connecting rod 104 may provide resistance resulting in movement of the connecting rod 104 along an x-axis to retract the actuating knob 102 once the actuating knob 102 is released by the user so that an outer surface the actuating knob 102 may be flush with outer surfaces of the first turn button 1702 and the second turn button 1702b, as illustrated by FIGS. 7 and 8.

In some implementations, a depth of the trolley bay 2502 may be limited such that the intermediate stopper 101 may not be able to be deployed when two horizontally-stacked trolleys 1708 are inserted within the trolley bay 2502 due to an insufficient gap between the horizontally-stacked trolleys for the retaining lever 120 to be deployed. In such situations, the mounting plate 116 may be mounted within the trolley bay 2502 at a position that is forward of the rearmost trolley such that the retaining lever 120 cannot be deployed to the secured position until the forward-most trolley has been removed from the trolley bay 2502.

In one example, the range of linear motion of the actuating knob 102 and the connecting rod 104 to engage and disengage the retaining lever 120, as well as to adjust positions of the actuating knob 102 between the first turn button 1702 and the second turn button 1702b from the galley monument, may be approximately 24 mm. In other examples, the range of linear motion of the connecting rod 104 may be greater than 24 mm.

Figure 10:
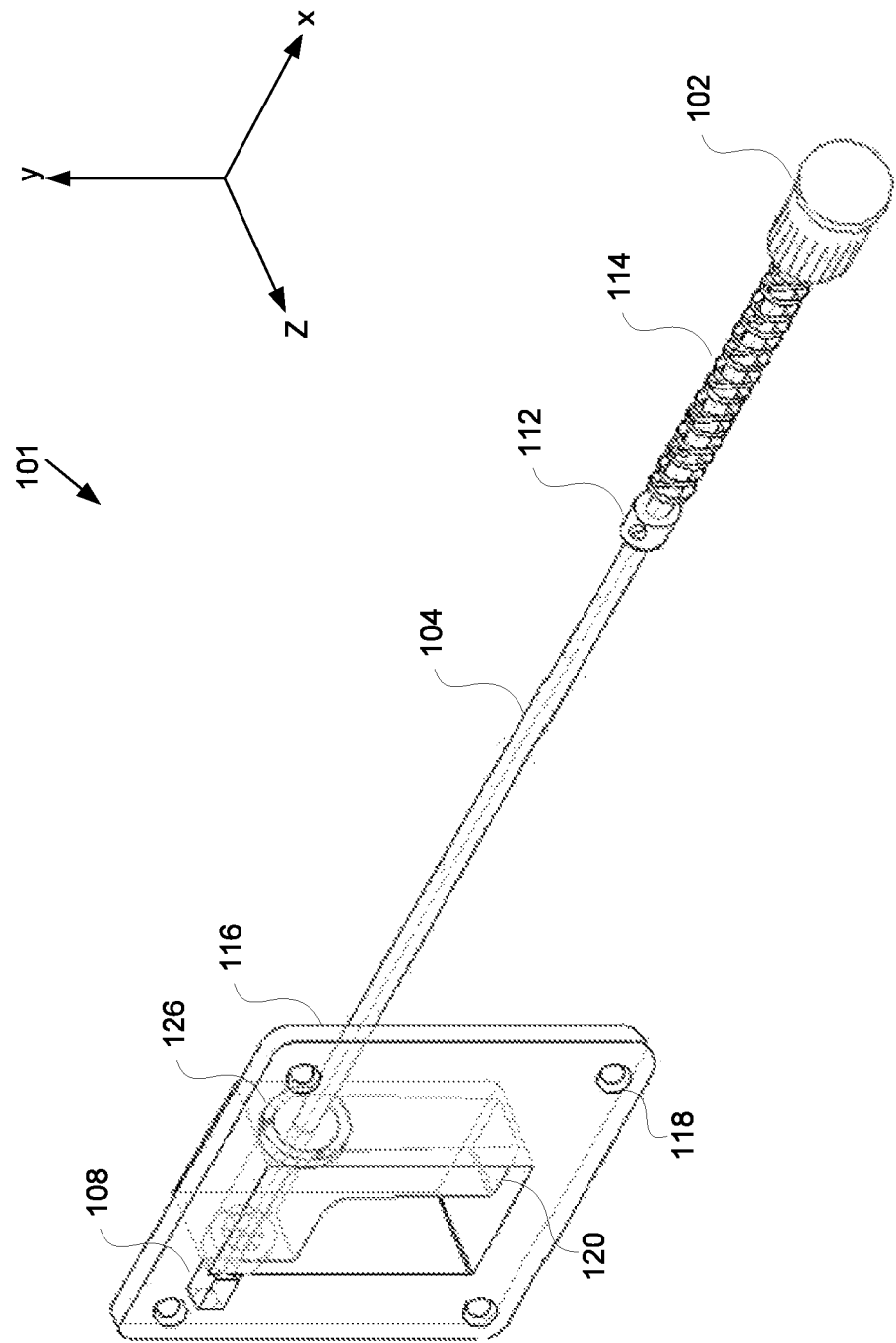
FIG. 10 is a perspective view of an intermediate retaining assembly.

FIG. 10 is a perspective view of the intermediate stopper 101, according to one example. In some implementations, a stop collar 112 may be fixedly connected to the connecting rod 104 to support and limit axial movement of an end of the spring 114, providing a surface for the spring 114 to compress against as the actuating knob 102 is pulled by a user. In some examples, the connecting rod 104 may be pulled through a detent 126, and a formed end 108 of the connecting rod 104 may be pulled into the retaining lever 120 as the actuating knob 102 is pulled into the extended position. The mounting plate 116 may be contoured to support and engage all or part of the retaining lever 120 to allow the retaining lever 120 to rotate between a first position and a second position in order to secure or release a trolley 1708 within a trolley bay 2502. This may allow the connecting rod 104 to move axially relative to the mounting plate 116, the retaining lever 120, and the detent 126. In the first, retracted position of the actuating knob 102, the connecting rod 104 may spin freely relative to the retaining lever 120, and rotation of the connecting rod 104 may not result in motion of the retaining lever 120. In the second, extended position of the actuating knob 102, rotation of the connecting rod 104 may produce proportional rotation of the retaining lever 120 since the formed end 108 at the second end of the connecting rod 104 is withdrawn into an interior portion of the retaining lever 120 when the connecting rod 104 is pulled to the extended position in such a way as to engage the retaining lever 120 and synchronize their relative rotation about an x-axis such that rotation of the connecting rod 104 causes corresponding rotation of the retaining lever 120.

In one example where the mounting plate 116 is secured to a vertical interior surface of the trolley bay 2502, the first position of the intermediate stopper 101 may correspond to a vertical orientation of the retaining lever 120 such that the retaining lever 120 fits within a complementary recess in the mounting plate 116 to allow a trolley 1708 to be inserted or withdrawn from the trolley bay 2502 without interfering with or impacting the intermediate stopper 101. The second position of the intermediate stopper 101 may correspond to a horizontal orientation of the retaining lever 120 such that an orientation angle of the retaining lever 120 is substantially perpendicular to a mounting surface of the mounting plate 116 such that the retaining lever 120 secures the trolley 1708 within the trolley bay 2502 by contacting a front surface of the trolley 1708 such that the retaining lever 120 abuts at least a portion of the front surface of the trolley 1708.

Figure 11B:
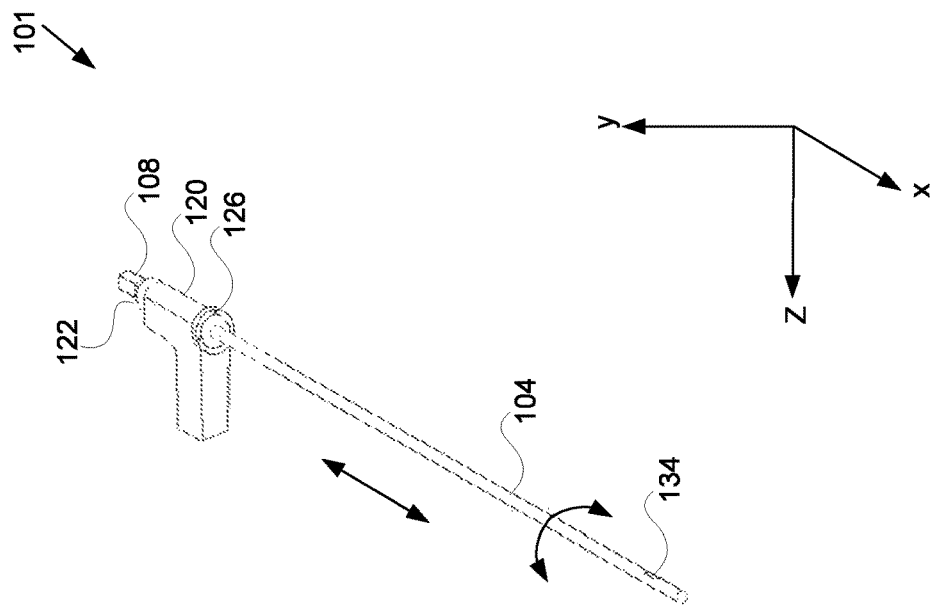
FIG. 11B is a perspective view of the connecting rod of FIG. 11A connected to the retaining lever.
Figure 11A:
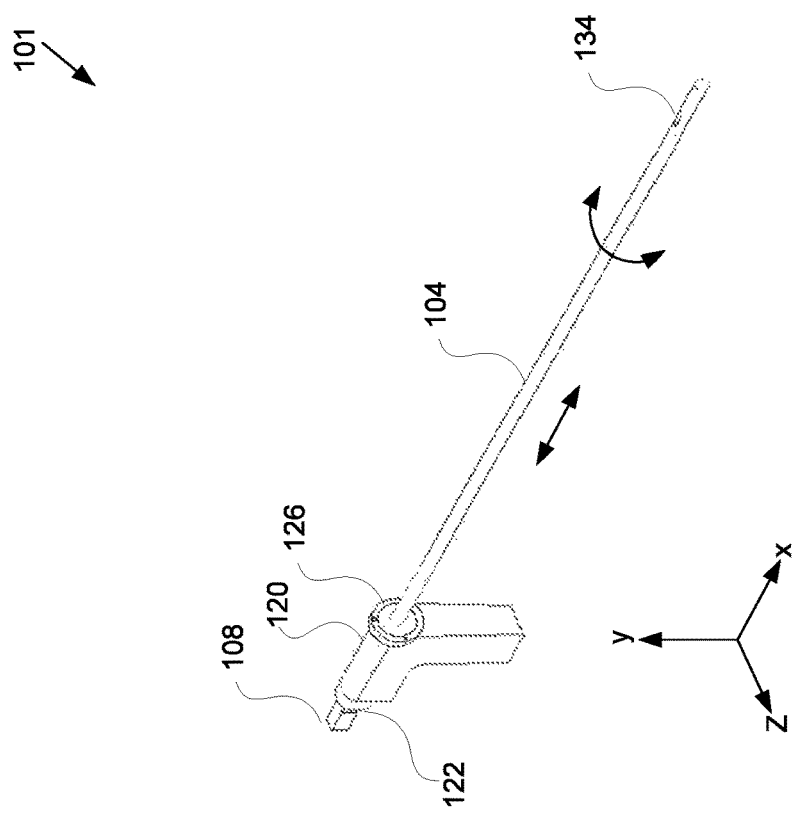
FIG. 11A is a perspective view of a portion of the intermediate retaining assembly of FIG. 10 including a connecting rod connected to a retaining lever.

FIGS. 11A-11B provide perspective views of a portion of the intermediate stopper 101 including a connecting rod 104 connected to a retaining lever 120, according to one example. The retaining lever 120 may also have or be connected to a retainer boss 122 and a detent 126. In some implementations, the detent 126 may be disposed at a first end of the retaining lever 120 along the connecting rod 104 toward a first end of the retaining lever 120 closer to the actuating knob 102 (illustrated by FIG. 10). The detent 126 may allow the axial position of the connecting rod 104 along an x-axis to remain fixed in a case where the actuating knob 102 is pulled to an extended position, and allow the actuating knob 102 to remain extended until pushed back in by a user overcoming a detent force of the detent 126, less any resistance due to the presence of the spring 114. In some examples, the retainer boss 122 may be disposed toward a second end of the retaining lever 120 adjacent to the formed end 108 of the connecting rod 104. The retainer boss 122 may provide a contact surface for the formed end 108 and an interface between the retaining lever 120 and the mounting plate 116 (such as illustrated by FIG. 10).

The connecting rod 104 may also include a rod key 134 at a first end. The rod key 134 may provide a connection point for the actuating knob 102 to connect to the connecting rod 104. In some examples, the actuating knob 102 may also be connected to the connecting rod 104 by a press or interference fit. At the second end of the connecting rod 104, the formed end 108 may connect to the retaining lever 120 through a retainer boss 122. The formed end 108 and the retainer boss 122 and/or the retaining lever 120 may have any number of matching cross sectional areas such that the formed end 108 may fit inside the retainer boss 122 and/or the retaining lever 120 as the actuating knob 102 and the connecting rod 104 are pulled along an x-axis by a user when moving the actuating knob 102 from the retracted to the extended position.

In an example where the connecting rod 104 is engaged and connected to the retaining lever 120 at the formed end 108, the retaining lever 120 may be rotated clockwise and counterclockwise about the x-axis through rotation of the actuating knob 102 and the connecting rod 104. In examples where the mounting plate 116 (FIG. 10) of the intermediate stopper 101 is mounted in a vertical orientation, for example, on a side panel 1104a or 1104b of a trolley bay 2502, then the retaining lever 120 as illustrated in FIG. 11A may be in a position or orientation angle to allow release of a trolley 1708 from within the trolley bay 2502. If the mounting plate 116 of the intermediate stopper 101 is mounted in a horizontal position, for example to the dividing panel 1108 above a trolley bay 2502, then the retaining lever 120 as illustrated in FIG. 11A may be in a position to secure the trolley 1708 within the trolley bay 2502.

In an example where the connecting rod 104 is engaged and connected with the retaining lever 120 when the formed end 108 is pulled into the retaining lever 120, the retaining lever 120 may be cooperatively rotated clockwise and/or counterclockwise about the x-axis through corresponding clockwise and/or counterclockwise rotation of the actuating knob 102 and the connecting rod 104. Turning to FIG. 11B, if the mounting plate 116 of the intermediate stopper 101 is mounted in a vertical position, for example on a side panel of a trolley bay 2502 (as illustrated by FIG. 1), then the retaining lever 120 as illustrated in FIG. 11B may be in a position to secure a trolley within the trolley bay 2502. If the mounting plate 116 of the intermediate stopper 101 is mounted in a horizontal position, for example above a trolley bay 2502, then the retaining lever 120 as illustrated in FIG. 11B may be in a position to release a trolley from within the trolley bay 2502. Further, in an example where the mounting plate 116 is mounted in a horizontal position above a trolley bay 2502, should the intermediate stopper 101 fail, the retaining lever 120 may rotate due to gravity into a position to prevent unintended release of a trolley contained within the trolley bay 2502. In an implementation where the mounting plate 116 is mounted in a vertical position adjacent to a trolley bay 2502, should the intermediate stopper 101 fail, the retaining lever 120 may rotate due to gravity into a position that would allow unintended release of a trolley contained within the trolley bay 2502.

Figure 12:
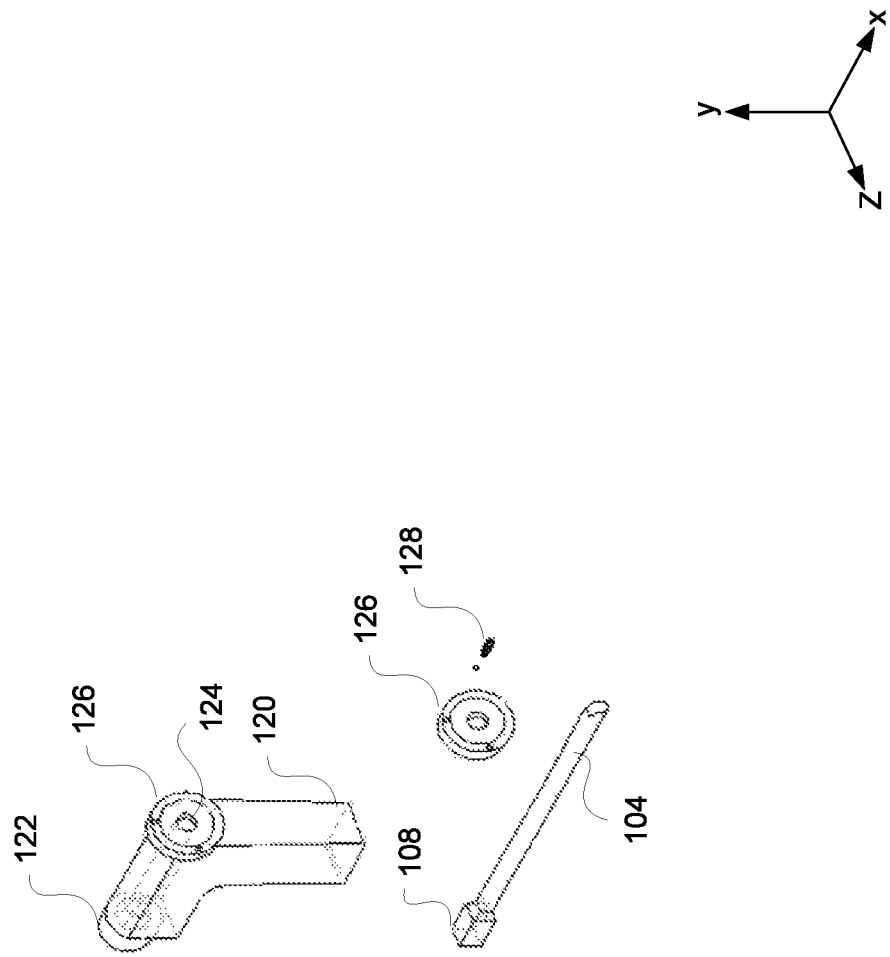
FIG. 12 is a perspective view of a retaining lever and related components.

FIG. 12 is a perspective view of a retaining lever 120 and related components, according to one example. In some implementations, the retaining lever 120 may include a detent 126 positioned on a first end and a retainer boss 122 positioned on a second end. A portion of the retaining lever 120 may be designed to restrict movement of a trolley 1708 through contact. In some examples, the detent 126 may be securely connected to the retaining lever 120 such that a hole in the center of the detent 126 may be aligned with a connecting rod cylinder 124 of the retaining lever 120. The detent 126 may be secured to the retaining lever 120 by at least one detent fastener 128, press fit to the retaining lever 120, or formed through combining features of both the retaining lever 120 and the detent fastener 128 into a single part.

In one example, the formed end 108 of the connecting rod 104 may be connected to the second end of the connecting rod 104 adjacent to the retaining lever 120. The cross-section of the formed end 108 may have a shape that is complementary with a shape of the retainer boss 122 such that the formed end 108 fits within the retainer boss 122 that may be rigidly/securely attached to the retaining lever 120 and/or part of the retaining lever 120 itself. In addition, the end of the connecting rod cylinder 124 may be shaped to match a shape of the formed end 108 to allow the formed end 108 to fit within an end of the connecting rod cylinder 124. As the connecting rod 104 and the formed end 108 move axially in response to pushing and/or pulling of the actuating knob 102, the formed end 108 may enter the connecting rod cylinder 124 at the second end of the retaining lever 120, engaging the retaining lever 120. Engagement of the retaining lever 120 by the formed end 108 along with rotation of the connecting rod 104 about an x-axis may result in rotation of the retaining lever 120 between and/or through the x-y and x-z planes.

Figure 13:
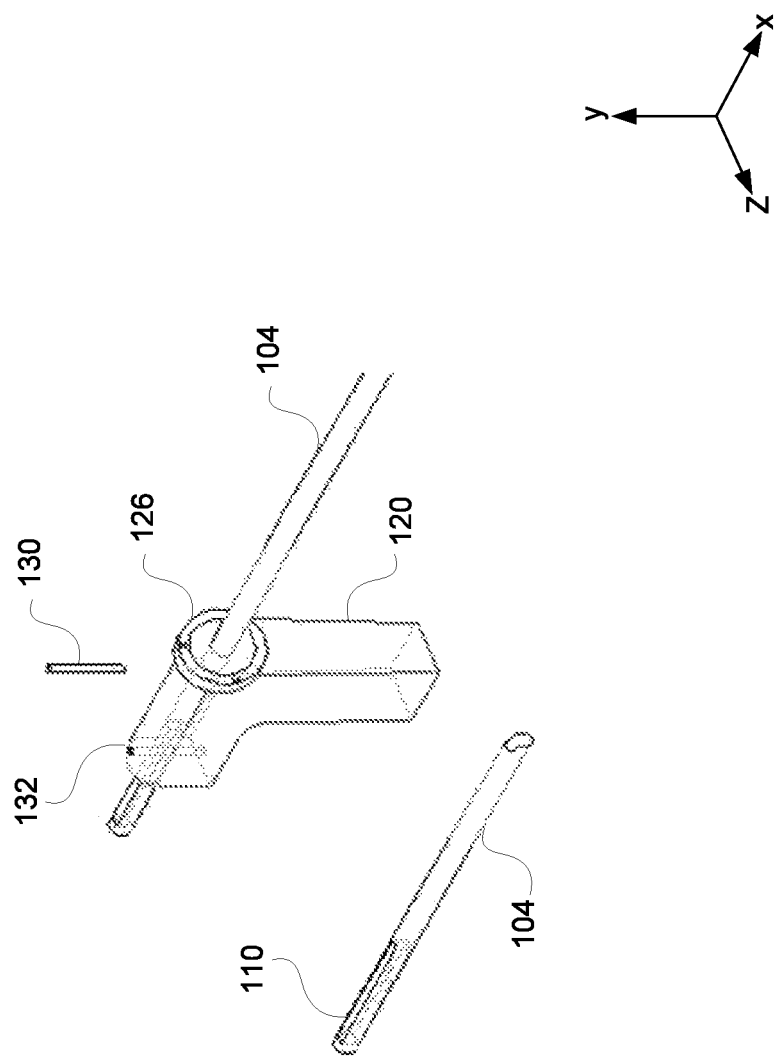
FIG. 13 is a perspective view of a connecting rod connected to a retaining lever.

FIG. 13 illustrates a perspective view of a connecting rod 104 connected to a retaining lever 120, according to one example. In some implementations, the retaining lever 120 may have a retainer pin hole 132 positioned toward a second end of the retaining lever 120 and substantially perpendicular to a longitudinal axis of the connecting rod 104. The second end of the connecting rod 104 may also include a rod slot 110 configured to receive a pin inserted through the retainer pin hole 132. In some examples, a pin 130 may be inserted and positioned inside the retainer pin hole 132 and through the end of the connecting rod 104 within the rod slot 110. In this manner, the connecting rod 104 may be able to move axially relative to the retaining lever 120, while the retaining lever 120 and the connecting rod 104 may rotate together about the x-axis, which may allow the connecting rod 104 to engage or disengage the retaining lever 120 to control rotational movement of the retaining lever 120 to secure and/or release a trolley 1708 inserted into the trolley bay 2502.

While the above text has highlighted the operation of the intermediate stopper 101 as it relates to trolleys, the same concepts would also apply for securing other types of containers as well, such as standard unit containers.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. An aircraft galley compartment disposed within an aircraft galley monument, the aircraft galley compartment comprising:
   an enclosure configured to house at least two equipment items, the enclosure comprising a rear surface, an upper wall, and opposing side walls, wherein a rear side of a first equipment item of the at least two equipment items upon stowing is disposed proximate the rear surface and a second equipment item of the at least two equipment items upon stowing is disposed horizontally proximate a front side of the first equipment item, the front side being opposite the rear side; and
   an intermediate retaining assembly for securing a lateral position of the first equipment item within the enclosure, the intermediate retaining assembly including
      a connecting rod,
      an actuating member rotatably coupled to a first end of the connecting rod, wherein manual rotation of the actuating member by a user causes axial rotation of the connecting rod when the actuating member is in an axially extended position;
      a retaining lever rotatably coupled to a second end of the connecting rod, wherein
         extension of the connecting rod to the axially extended position causes engagement of the second end of the connecting rod with the retaining lever such that axial rotation of the connecting rod via manual rotation of the actuating member causes a proportional amount of rotation of the retaining lever, and
         the retaining lever is configured to rotate between a first position for securing the lateral position of first equipment item within the enclosure and a second position for allowing insertion or release of the first equipment item from the enclosure, and
      a mounting plate secured to one of the upper surface and a side wall of the opposing side walls of the enclosure such that the mounting plate is disposed adjacent to a stowage position of the first equipment item, the mounting plate including a complementary recess configured to receive the retaining lever when the retaining lever is in the second position such that the retaining lever is configured to avoid interfering with the first equipment item during insertion into or removal from the enclosure.

2. The galley compartment of claim 1, wherein the actuating member, when not in the axially extended position, is substantially flush with a front surface of the galley.

3. The galley compartment of claim 2, wherein the actuating member is a knob.

4. The galley compartment of claim 1, wherein a length of the connecting rod corresponds to approximately half a distance between a front surface and the rear surface of the enclosure such that the retaining lever is positioned approximately midway between the front surface and the rear surface of the enclosure.

5. The galley compartment of claim 1, wherein the intermediate retaining assembly further comprises:
   a spring element disposed around an outer surface of the connecting rod, the spring element configured to compress against a stop element at least partially surrounding the connecting rod when the actuating member is in the extended position such that the spring element is configured to cause the connecting rod to move to an axially retracted position upon release of the actuating member from the extended position.

6. The galley compartment of claim 5, wherein axial movement of the connecting rod to the retracted position causes disengagement of the second end of the connecting rod from the retaining lever.

7. The galley compartment of claim 6, wherein the connecting rod, in the retracted position, is configured to move axially and radially independently of the retaining member such that rotation of the connecting member by the actuating member in the retracted position causes the connecting rod to rotate freely relative to the retaining member.

8. The galley compartment of claim 1, wherein the connecting rod is configured to slideably pass through a front surface of the galley compartment such that the actuating member abuts an outer face of the front surface when the connecting rod is in an axially retracted position.

9. The galley compartment of claim 8, wherein the actuating member is positioned between turn buttons of a turn button assembly for securing the second equipment item of the at least two equipment items within the enclosure, wherein an outer surface of the actuating member in the axially retracted position is flush with outer surfaces of the turn buttons.

10. The galley compartment of claim 1, wherein extension of the connecting rod to the axially extended position causes the second end of the connecting rod to be inserted into an interior portion of the retaining lever.

11. The galley compartment of claim 1, wherein the intermediate retaining assembly is configured to operate to secure the first equipment item within the enclosure independently of a securing mechanism configured to secure the second equipment item of the at least two equipment items within the enclosure.

12. The galley compartment of claim 1, wherein the retaining lever, when in the first position for securing the first equipment item within the galley compartment, is configured to abut at least a portion of a front surface of the first equipment item.

13. The galley compartment of claim 1, wherein the aircraft galley compartment is a trolley bay, and the at least two equipment items comprise two trolleys.

14. The galley compartment of claim 1, wherein the mounting plate is secured to a horizontal interior surface of the enclosure such that the first position of the retaining lever for securing the first equipment item within the enclosure corresponds to a substantially vertical orientation of the retaining lever.

15. The galley compartment of claim 14, wherein the horizontal interior surface is disposed adjacent to the upper surface of the enclosure.

16. The galley compartment of claim 1, wherein the mounting plate is secured to a vertical interior surface of the enclosure such that the first position of the retaining lever for securing the first equipment item within the enclosure corresponds to a substantially horizontal orientation of the retaining lever.

17. The galley compartment of claim 1, wherein the mounting plate is secured to an interior side surface of the enclosure such that the intermediate retaining assembly is disposed adjacent to a side panel of the enclosure.

18. The galley compartment of claim 1, further comprising a detent surrounding the connecting rod adjacent to a forward end of the retaining lever, wherein the detent is configured to maintain the connecting rod in the axially extended position until a pushing force is applied to the actuating knob to force the connecting rod into an axially retracted position.

19. The galley compartment of claim 1, further comprising a forward retaining assembly including one or more turn buttons for securing a lateral position of the second equipment item within the enclosure.

20. The galley compartment of claim 19, wherein the one or more turn buttons are coupled to at least one of the upper wall or a side wall of the opposing side walls of the enclosure.

\* \* \* \* \*